United States Patent Office 2,803,441
Patented Aug. 20, 1957

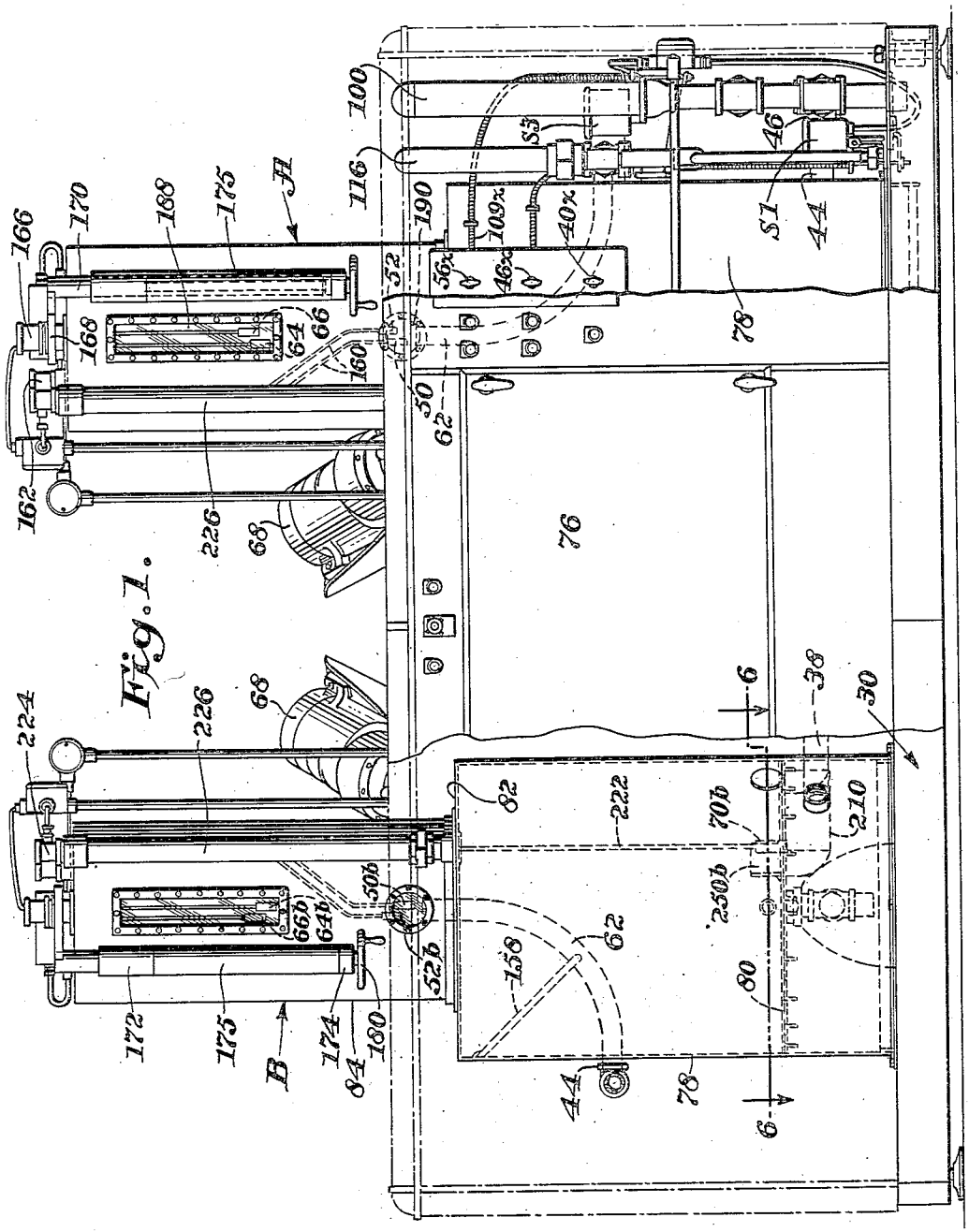

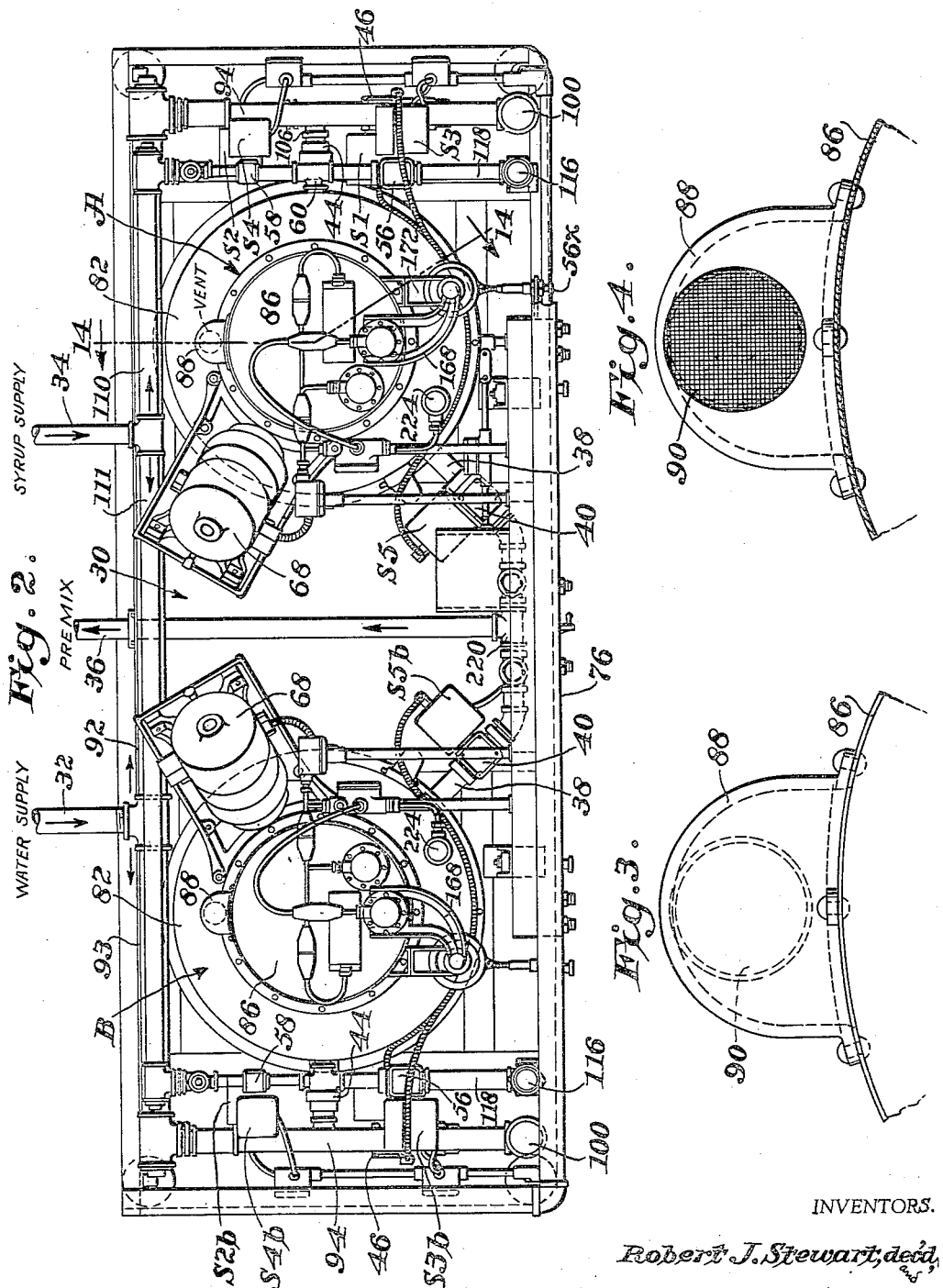

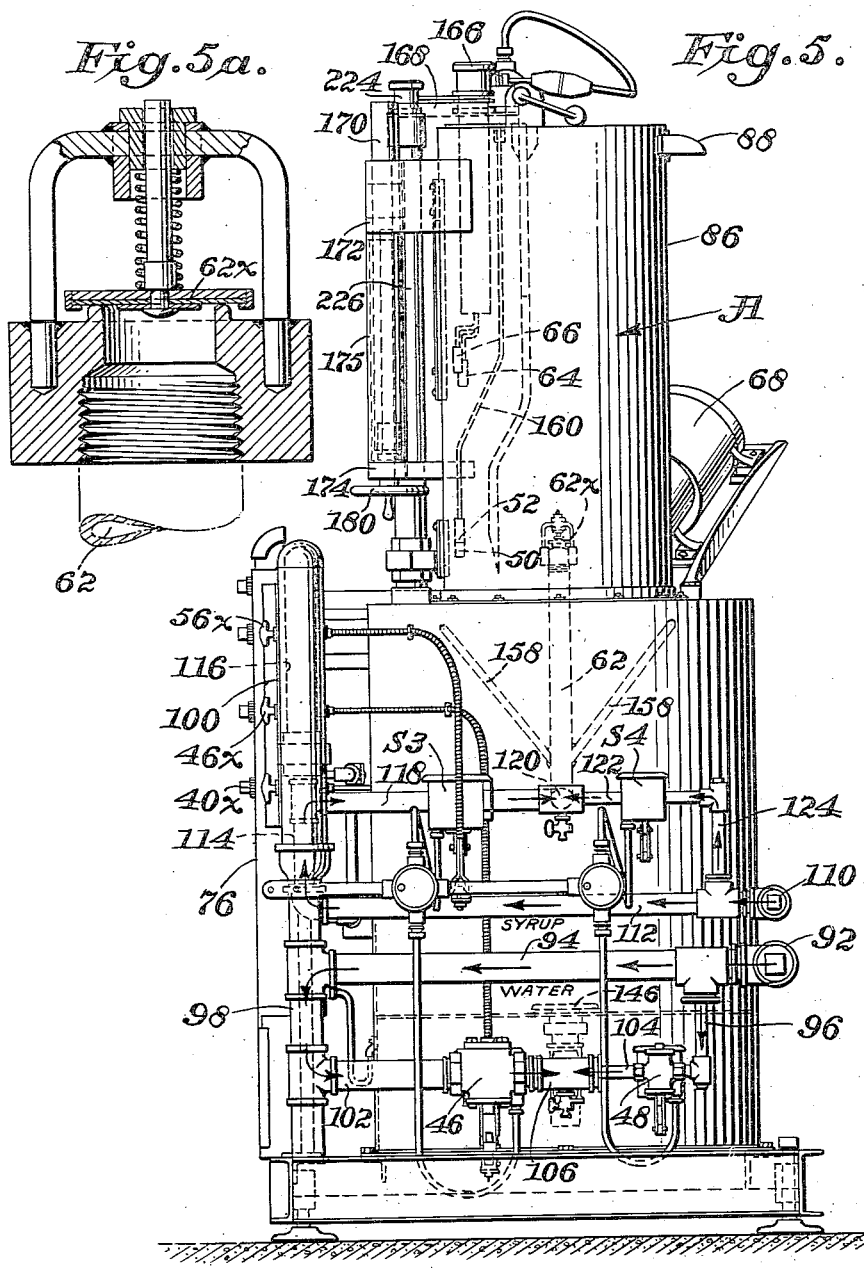

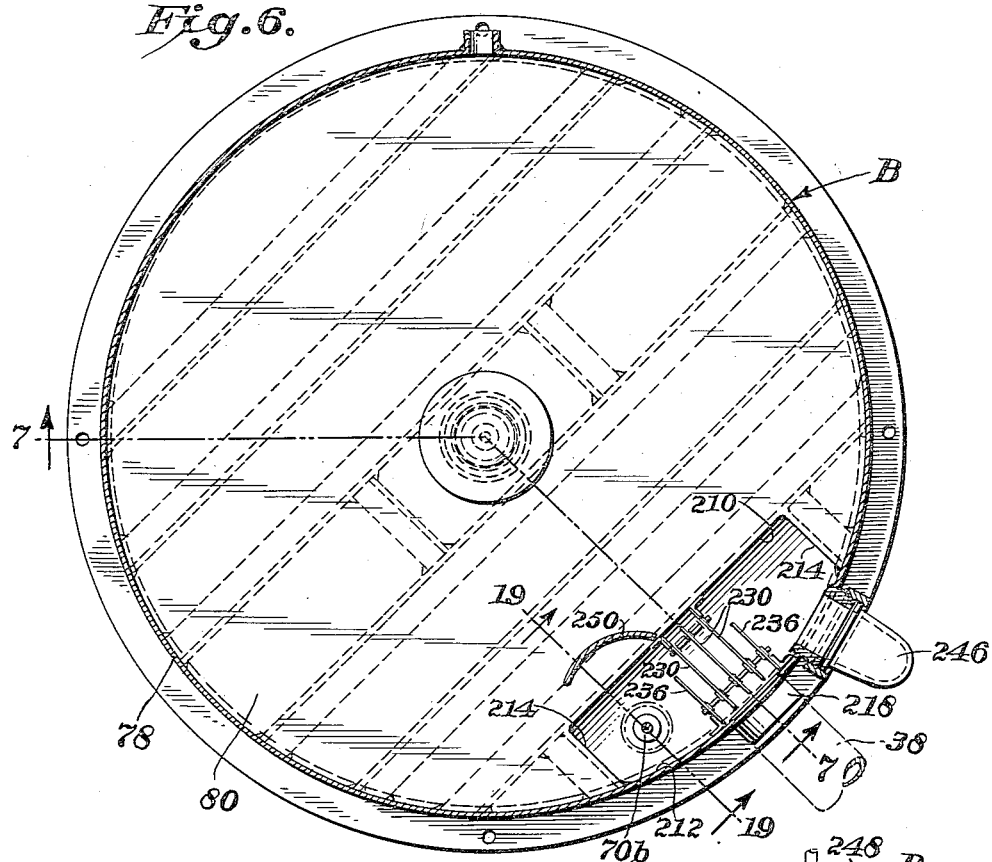
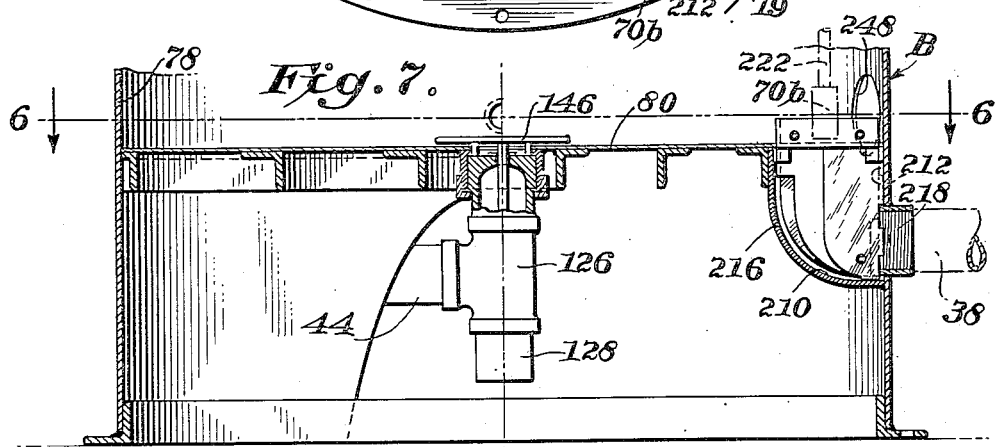

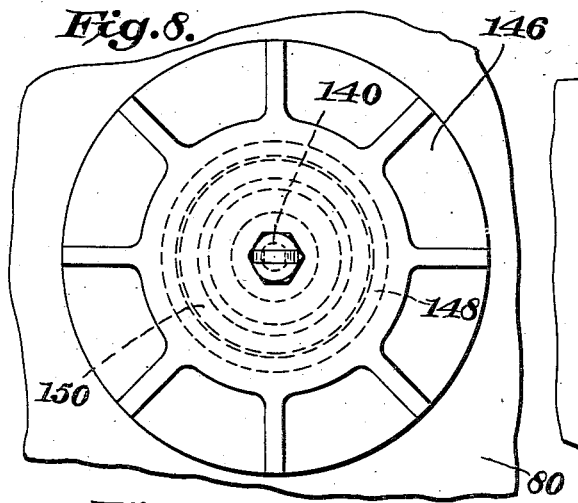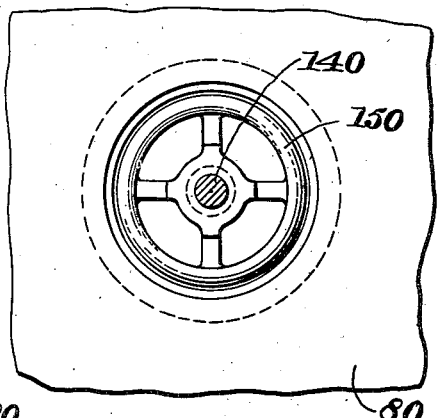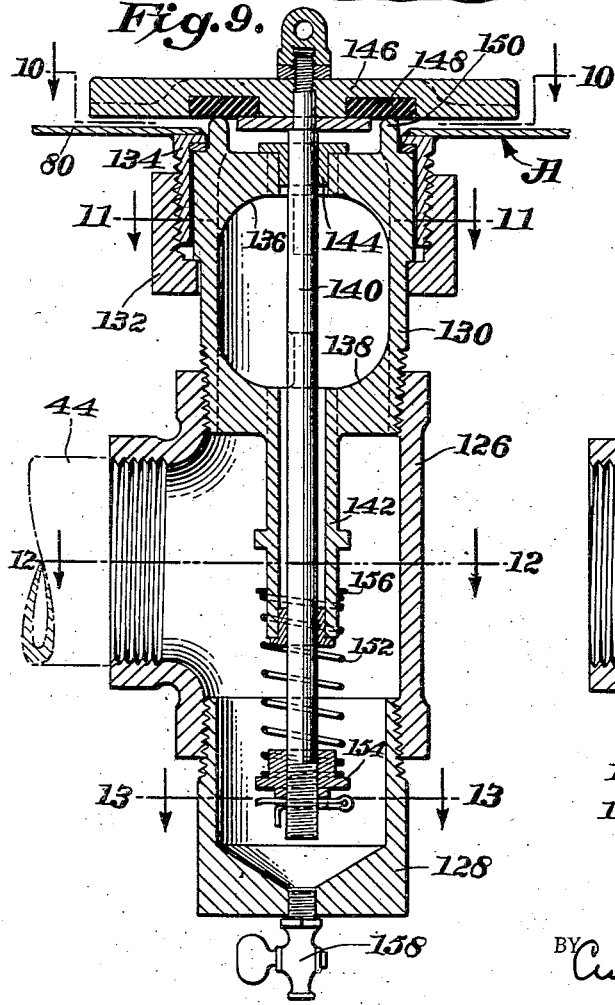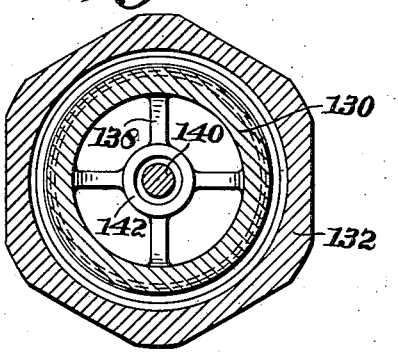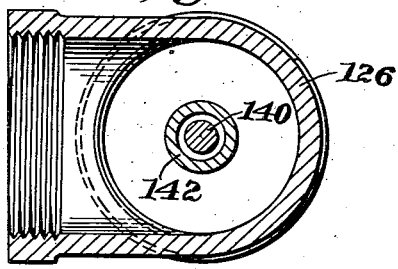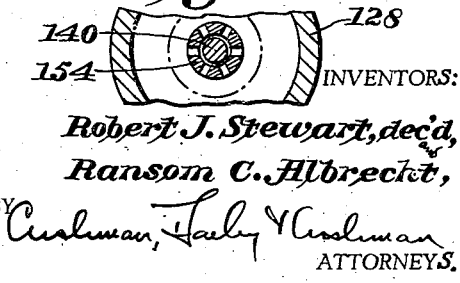

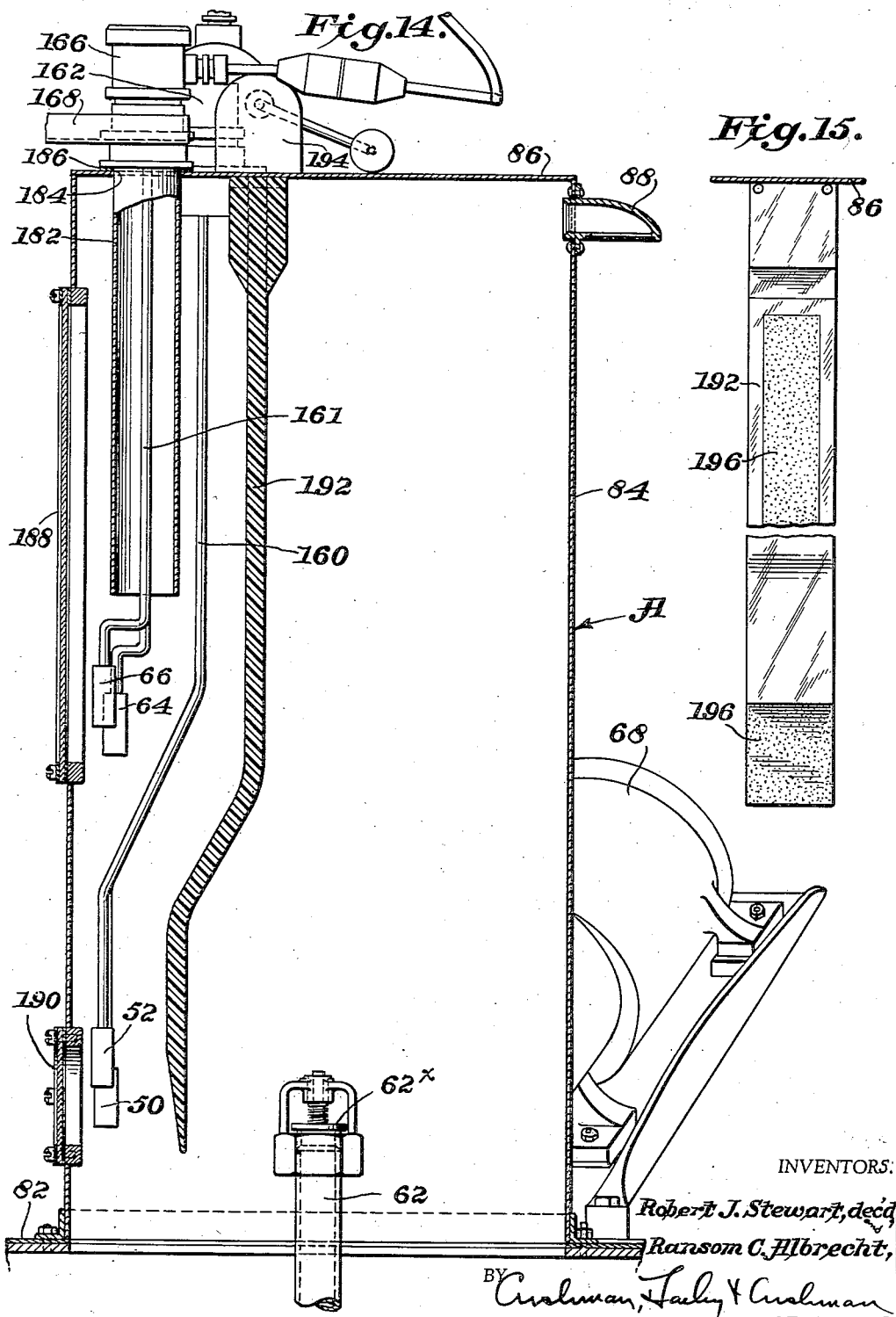

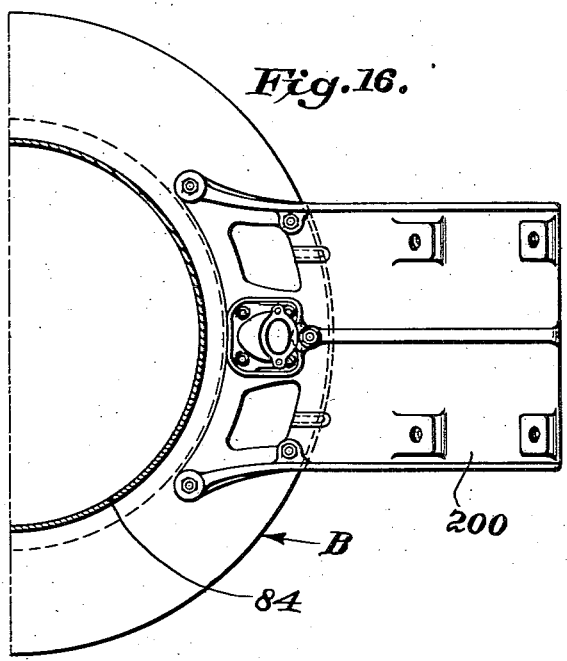
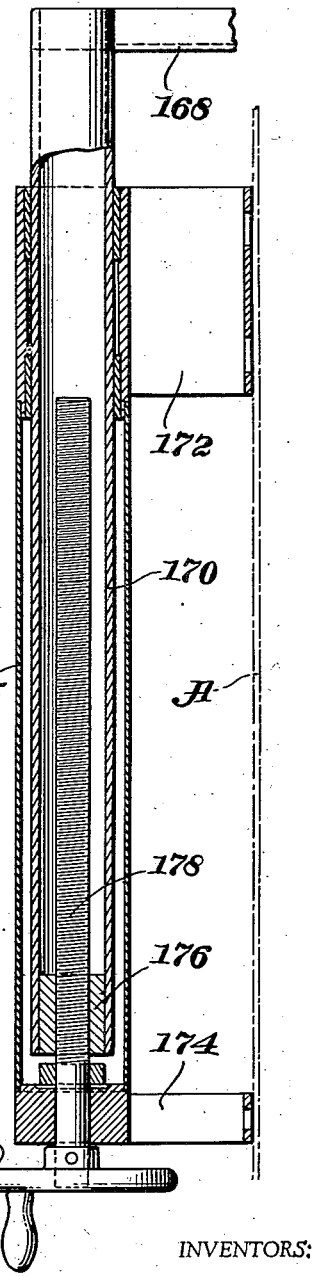
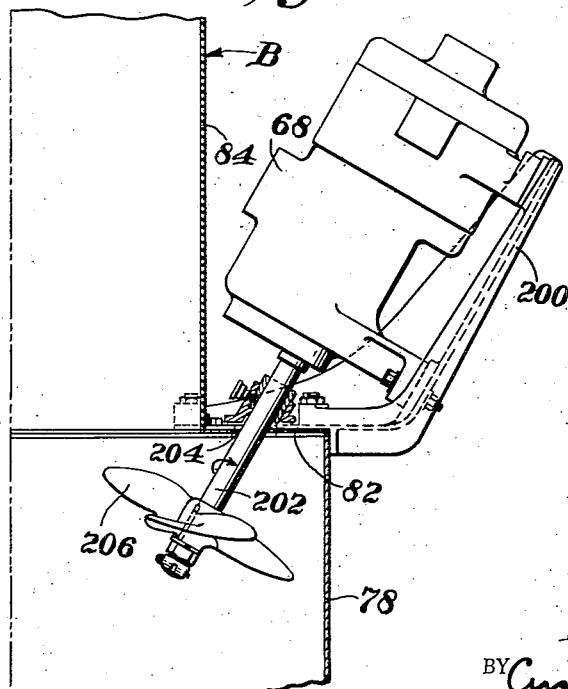

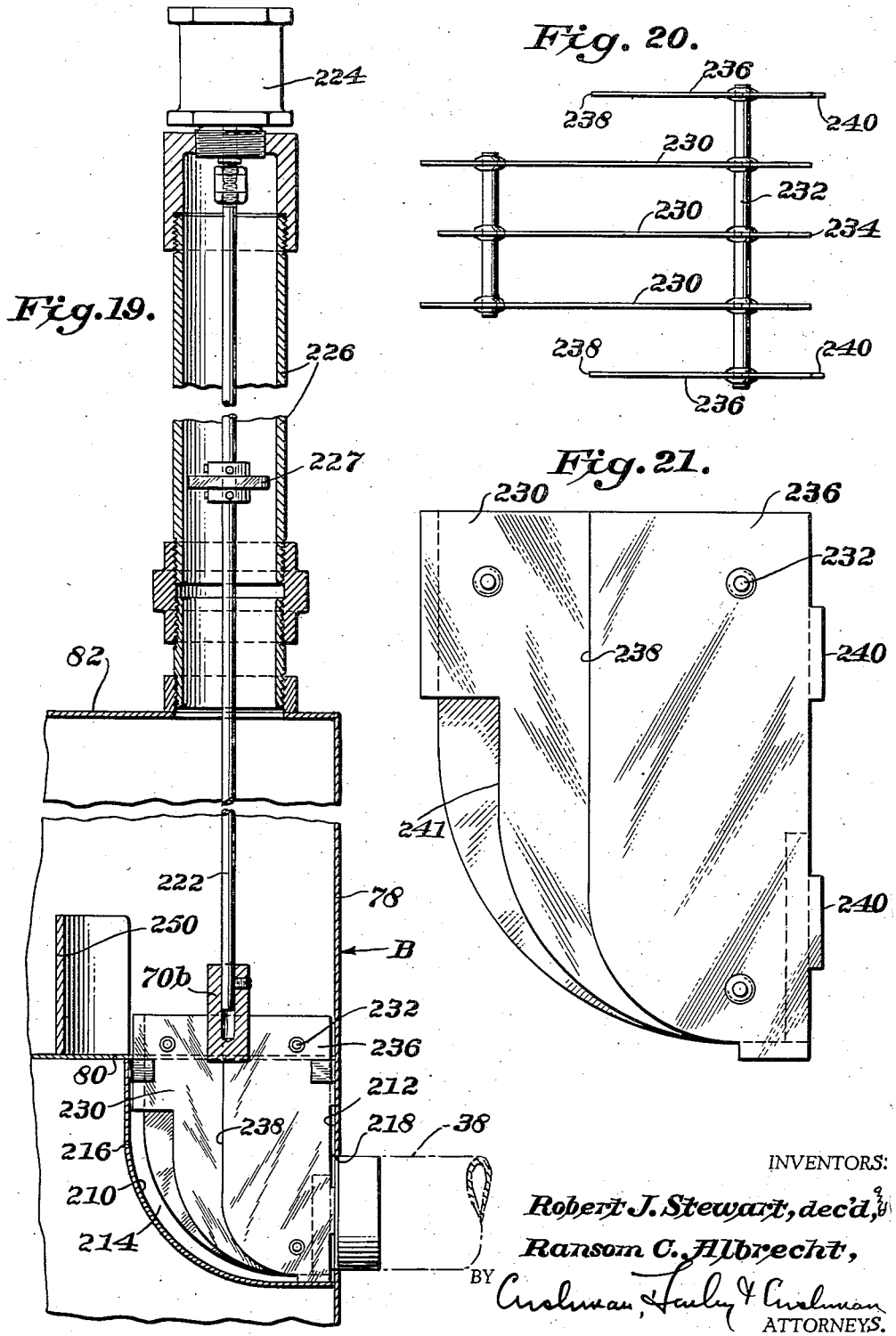

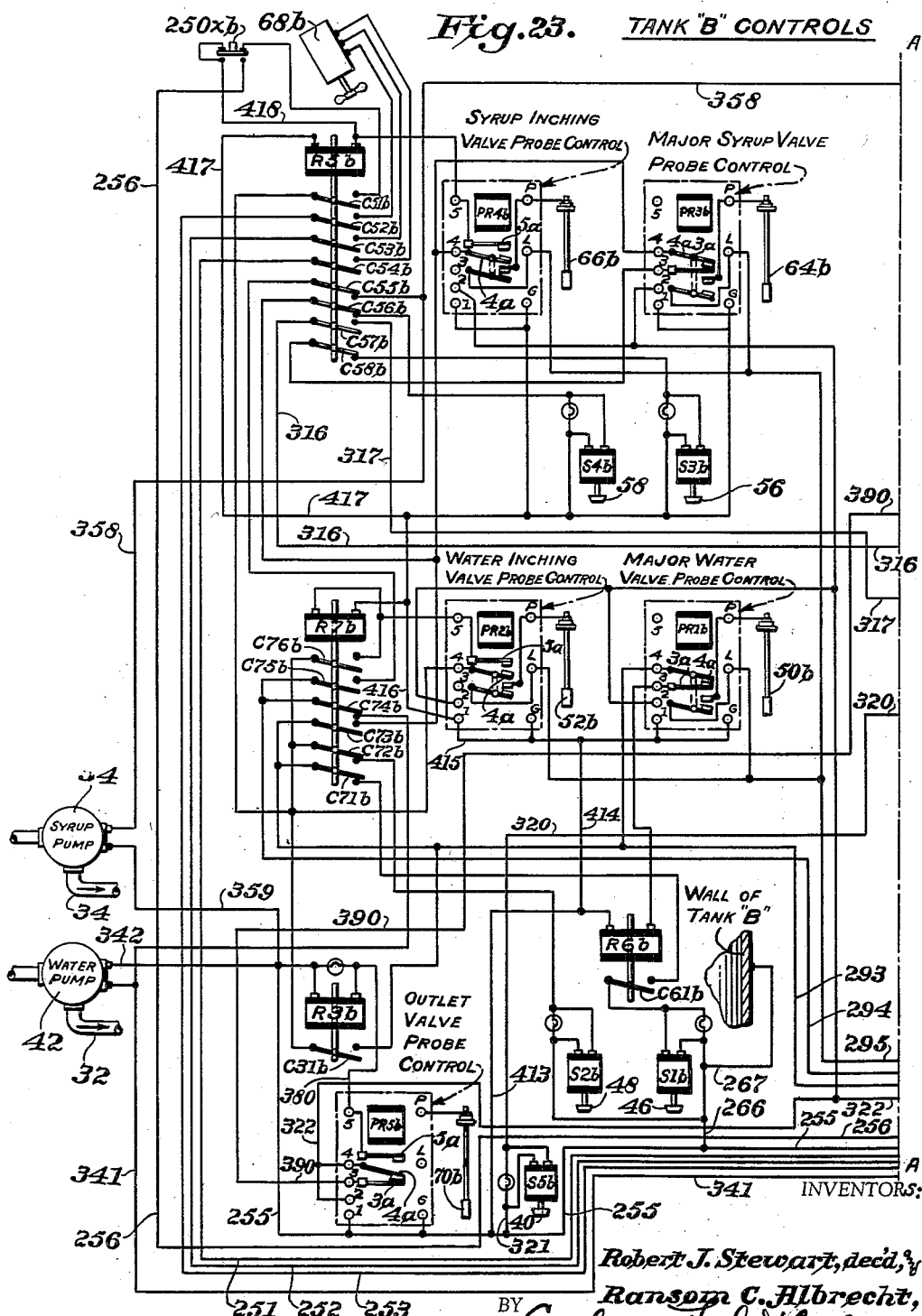

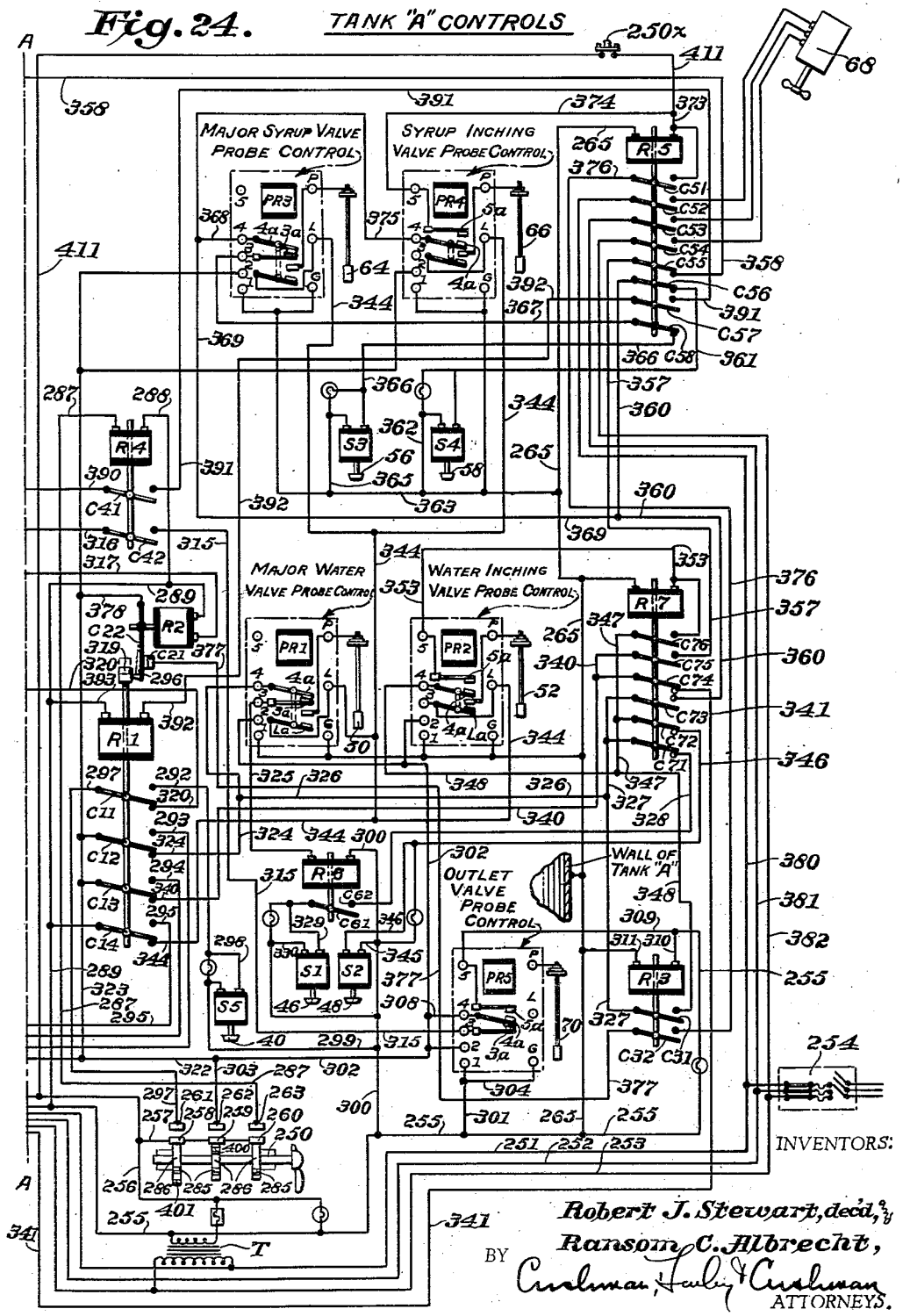

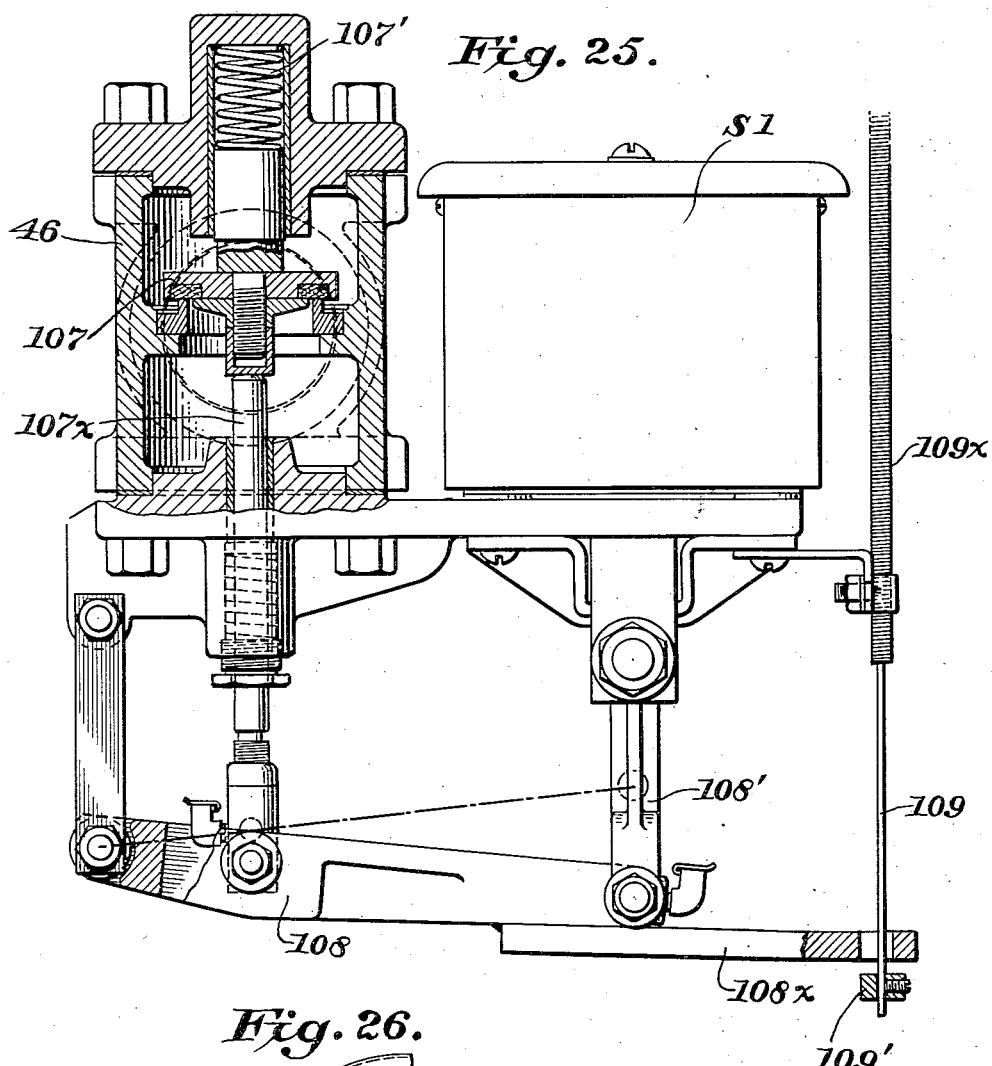
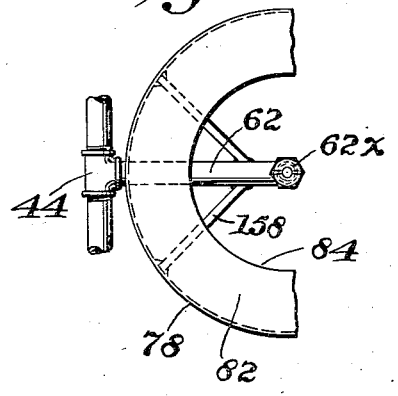

2,803,441

LIQUID PROPORTIONING APPARATUS

Robert J. Stewart, deceased, late of Severna Park, Md., by Cora Lee Stewart, executrix, Severna Park, and Ransom C. Albrecht, Baltimore, Md., assignors to Crown Cork & Seal Company, Inc., Baltimore, Md., a corporation of New York Application June 27, 1950, Serial No. 170,494

9 Claims. (Cl. 259—1)

The present invention relates to liquid proportioning apparatus.

The embodiment of the invention hereinafter disclosed is described in use for proportioning water and a flavoring syrup for the preparation of a carbonated beverage. However, it will be understood that the invention is applicable to the proportioning of other liquids for other purposes.

In the bottling of carbonated beverages it has long been the practice to first flow a charge of syrup into a bottle and then flow carbonated water into the bottle. Because the syrup is relatively viscous as compared to the water, the syrup initially will lie in a strata at the bottom of the bottle. Therefore, it is necessary to agitate the bottle in some way, either by hand or by machine, to cause the syrup to be distributed in the water.

Aside from certain difficulties encountered in causing the syrup and water to be thoroughly mixed in the bottle within a time interval which will keep pace with recently developed high-speed bottle filling equipment, a disadvantage of the above system is that it is frequently impossible to obtain exactly the proper and desired proportion of syrup and water in a bottle. In more detail, the filling machines used to flow syrup and water into a bottle usually can be operated to place an exactly measured charge of syrup in the bottle. However, in order to meet the trade requirement that every bottle in a case be filled to exactly the same height, the water flowed into the bottles is not measured volumetrically. Instead, water flow into the bottle continues until the liquid level reaches a predetermined height from the base of the bottle. While this height is so set that the average bottle will receive a proper charge of water, nevertheless, even the most carefully molded bottle may have some internal irregularities which cause its capacity to vary from standard. Therefore, controlling the flow of water by the height of liquid in the bottle may result in inaccurate measuring of the water.

An object of the invention is to provide an apparatus for exactly measuring soft drink ingredients and mixing such ingredients.

Another object of the present invention is to provide an apparatus to insure that the proportions of two liquids in a mixture can be controlled exactly and independently of the head of the liquids.

By the system of the invention, the proportioning of the liquids is entirely independent of the head at the liquid source. This is an important consideration in the mixing of liquids for use in soft drinks because bottling plants usually store flavoring syrup in settling tanks. Therefore, any proportioning system which can be affected by the head of syrup from a gradually emptying tank may produce a mixture of varying accuracy.

Another object of the invention is to provide a liquid proportioning system wherein the inflow of the liquids is controlled by their rise in a tank, so that the rate of flow has no effect upon the measurement of the liquids.

Still another object of the invention is to provide an apparatus of the above character which includes parts so designed as to minimize possibility of aeration of the liquids in the apparatus.

A further object of the invention is to provide a proportioning apparatus including two proportioning tanks provided with controls whereby the two tanks will alternately fill and discharge, discharge of a filled tank automatically occurring when the liquid level in the discharging tank drops to a given point.

Another object of the invention is to provide control means which can be operated either manually or automatically.

Other objects and advantages of the invention will be apparent from the following specification and accompanying drawings.

In the drawings:

Figure 1 is a front elevation of the apparatus, portions of the front wall of an enclosing cabinet being broken away.

Figure 2 is a top elevation of the apparatus, the front of the apparatus being at the lower edge of the view.

Figure 3 is a detail top elevation of a tank vent.

Figure 4 is a bottom elevation of the Figure 3 vent.

Figure 5 is an end elevation of the apparatus, the view showing the end which appears at the right in Figures 1 and 2.

Figure 5a is an axial section of the syrup inlet valve.

Figure 6 is a horizontal section of the tank of the apparatus which appears at the left of Figure 1, the view being taken on the line 6—6 of Figures 1 and 7.

Figure 7 is a vertical section on the angled line 7—7 of Figure 6.

Figure 8 is a top elevation of an inlet check valve provided on each tank of the apparatus.

Figure 9 is a vertical axial section of the Figure 8 valve.

Figure 22:
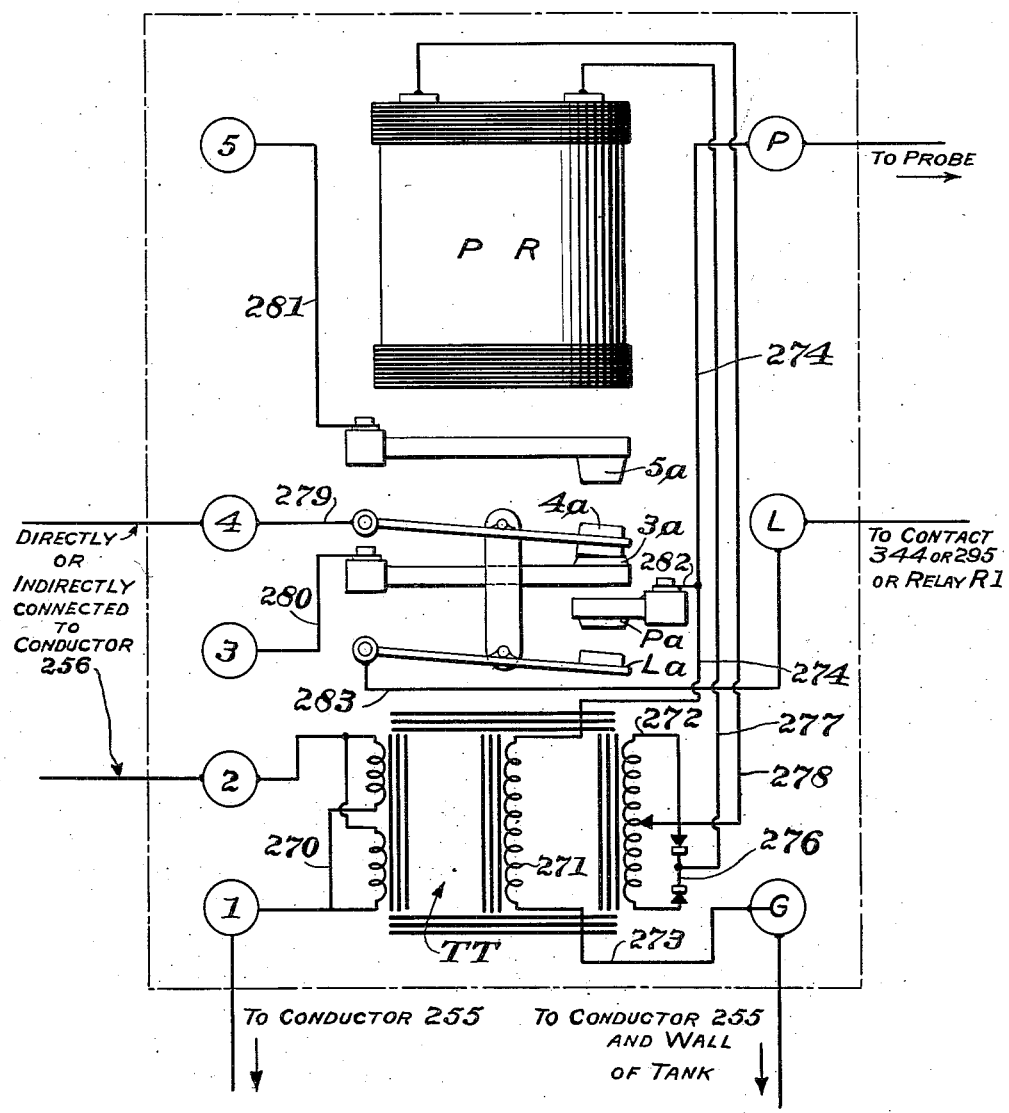

Figures 10, 11, 12, and 13 are horizontal sections on the lines 10—10, 11—11, 12—12, and 13—13, respectively, of Figure 9.

Figure 14 is a vertical section through the upper portion of the tank which appears at the right of Figures 1 and 2, the view being taken on the angled line 14—14 of Figure 2.

Figure 15 is a detail elevation of a light refracting plate provided in the Figure 14 structure.

Figure 16 is a detail horizontal section showing a mixing motor mounting in top elevation.

Figure 17 is a detail vertical section showing a mixing motor and mixing element or impeller mounted on the Figure 16 structure.

Figure 18 is a detail view showing an arrangement for vertically adjusting liquid level controlling means, portions of the view being in vertical section.

Figure 19 is a detail elevation on the line 19—19 of Figure 6 and showing the discharge control for a tank.

Figure 20 is a top elevation of a vortex preventing arrangement provided at the outlet of each tank.

Figure 21 is an elevation of the Figure 20 device.

Figure 22 is a circuit diagram of the probe controlled devices used in the apparatus.

Figures 23 and 24, when joined at the lines A—A, comprise a diagrammatic showing of the electrical controls of the entire apparatus.

Figure 25 is an enlarged view of a valve operating device, the valve being shown in axial section, and Figure 26 is a detail view of a tank showing its top removed and illustrating the syrup inlet as viewed from above.

The construction and operation of the apparatus of the invention generally may be described as follows: Referring to Figure 2, the apparatus includes two tanks generally designated A and B and which are mounted on a base 30. When the apparatus is to be used to mix syrup and water for a carbonated beverage, plain or uncarbonated water will be supplied to the apparatus through a common supply or inlet line 32 and syrup will be delivered through a common syrup supply or inlet line 34, both lines entering the rear of the apparatus. The rear of the apparatus appears at the top of Figure 2.

The tanks A and B are identical except that most elements of one tank are oppositely disposed with respect to like elements of the other tank. For example, as shown in Figure 2, each tank has identical connections with the inlet lines 32 and 34 and also with a common outlet line 36, but the inlet fittings of tank A are on its right side while the corresponding fittings of tank B are on the left side of tank B. Therefore, throughout the specification and drawings, corresponding mechanical elements of both tanks are given the same reference characters. However, in the description of the electrical probes, relays and wiring elements set forth in the discussion of the circuits of Figures 22, 23 and 24, electrical elements associated with tank B terminate with the letter "b."

In normal operation, and with reference to Figure 2, while one tank, for example, tank B, has all liquid inlets closed and is emptying through its outlet line 38 and outlet valve 40 to common outlet line 36 and a carbonator or saturator, not shown, the other tank A will be filling with proportioned charges of liquids and will then mix the liquids.

The apparatus may be operated through the above cycle either under automatic control or under manual control of an attendant.

Under automatic control, the filling cycle of a tank is as follows: With the outlet valve 40 of tank A closed, a water pump 42 diagrammatically shown in Figure 23 will deliver water through common inlet line 32 and thence through other lines hereinafter described so that water will enter tank A through an inlet line 44 (Figure 2) which opens to the bottom wall of the tank as shown in Figure 9. Water will be supplied to tank A inlet line 44 by two valves 46 and 48 shown in Figures 2 and 5, valve 46 controlling the major or main water flow and valve 48 controlling the minor or inching water flow. When the level of the water in tank A reaches a lower water probe 50 illustrated in Figure 5, an electrical circuit controlled by this probe will close the major water inlet valve 46 of tank A so that water flow to inlet line 44 will now be reduced because flow only occurs through a relatively small inching water valve 48. Hence, the level of the water in tank A will now rise slowly until it reaches an inching or upper and final water probe 52. At this moment, a circuit will be actuated to close the inching water valve 48 (Figures 2 and 5) and start operation of a syrup pump 54 diagrammatically shown in Figure 23. Also, a major syrup supply valve 56 and a minor or inching syrup supply valve 58 will open so that syrup will flow through both of these valves to a syrup inlet line 60. As is shown in Figures 1 and 5, syrup inlet line 60 includes an upwardly curving portion 62 which opens to the upper portion of the tank A, with its outlet mouth facing upwardly on the axial center line of tank A.

Syrup will continue to flow through both of the syrup valves 56 and 58 until the level of the liquid in tank A reaches a major syrup probe 64. Thereupon, circuits will be actuated to close the major syrup supply valve 56. Syrup flow through the inching syrup valve 58 will continue so that the level of the liquid will slowly rise until it reaches an inching or upper and final syrup probe 66. When this occurs, an electrical circuit will close the inching syrup valve 58, syrup pump 54 will stop operation and a mixer 68 shown in Figure 17 will begin operation to create currents within the liquid in tank A to thereby mix the syrup and water.

Mixer 68 will continue to operate until the level of the liquid in the other and emptying tank B drops away from an outlet probe 70 (Figure 7) of tank B. When this occurs, an electrical circuit will be actuated to cause the outlet valve 40 of tank B to close. Simultaneously, the circuit connections will cause the mixer 68 of tank A to stop operation and the tank A outlet valve 40 to open so that the mixture in tank A will now flow to common outlet line 36. In addition, the circuit controls will cause the two water inlet valves 46 and 48 of tank B to open and the water pump 42 to resume operation. Tank B will then go through the same proportioning or filling and mixing cycle as has been described above in connection with tank A.

Operation under manual control is hereinafter explained in detail, but generally may be described as involving manually opening the main water valve 46 of a tank and keeping that valve open until the attendant notes that the water has reached main water probe 52. Then the main syrup valve 56 will be opened and held open until the syrup reaches main syrup probe 66. Mixer 68 will then be operated until the attendant notes that the other tank has emptied, at which time the attendant will stop the mixer, open the outlet valve 40 of the filled tank and close the outlet valve 40 of the empty tank. Thereafter the attendant can fill the empty tank by the same series of manual valve operations just described.

The outlet line 36 preferably will be connected to a saturator or carbonator in which the mixture will be carbonated before flowing to a bottle filling machine.

The detailed construction of the apparatus is as follows: As shown in Figures 1 and 2, the two tanks generally designated A and B stand upright upon a base 30. Walls to enclose at least the front and ends of the apparatus extend upwardly from base 30, the front wall being designated 76. As Figure 1 indicates with respect to tank B, each tank includes a lower cylinder such as 78 provided with a bottom wall 80. The top wall 82 of cylinder 78 is annular in plan, and an upper bottomless cylinder 84 of less diameter than cylinder 78 is fitted to the inner edge of wall 82. Upper cylinder 84 is closed by a top wall 86.

A vent 88 is provided adjacent the top wall 86. As is indicated in Figures 3 and 4, the vent includes a fine mesh screen 90 fitted in a downwardly facing port. The provision of the vent prevents air locks in the tank, the screen preventing dust particles from reaching the tank interior.

It will be observed from the foregoing that, in general, the upper portion of each tank is of reduced diameter. The principal reason for thus reducing the cross-section of the tanks at their upper portions is to enable a slight inflow of liquid to cause a fairly substantial rise in height of the liquid and so that the liquid level responsive probes can be correspondingly vertically spaced.

The piping for delivering water to the tanks is as follows: Referring to Figure 2, the common water inlet pipe 32 joins two pipes 92 and 93 which extend horizontally across the rear of the apparatus, but in opposite directions so that pipe 92 leads to tank A and pipe 93 leads to tank B. Because the connections of the respective pipes 92 and 93 to the respective tanks are identical, only the connections to tank A will be described in detail. Referring also to Figure 5, at its outer end, pipe 92 is connected to a pipe 94 which extends horizontally toward the front of the apparatus. At its rearward end pipe 94 has connected thereto a downwardly and vertically extending pipe 96 of reduced diameter. At its forward end, pipe 94 joins a vertically extending pipe 98. A surge chamber 100 is connected to the upper end of pipe 98, and the lower end of pipe 98 opens to a lower horizontal pipe 102 which is axially aligned with a forwardly extending pipe 104 connected to the lower end of the small vertical pipe 96. The lower horizontal pipes 102 and 104 join a T-fitting 106 which, as shown in Figure 2, is connected to the water inlet line 44 of tank A.

It will be observed that water entering the upper pipe 94 may move to the T-fitting 106 and inlet pipe 44 from two directions, viz., either directly downwardly and forwardly through the reduced pipes 96 and 104, or forwardly and then by return flow in pipe 102 to the forward side of T-fitting 106. Because the pipes 96 and 104 are of reduced diameter, the flow therethrough will be reduced correspondingly to provide the inching flow into the tank.

As is shown in Figure 5, the inching valve 48 is positioned in the pipe 104 and the major water flow valve 46 is positioned in the pipe 102. These valves may be of any suitable type but are preferably reciprocating spring-closed valves adapted to be opened electromagnetically. The major water valve 46 of tank A is operated by a solenoid S1, and the inching water flow valve 48 of tank A is operated by a solenoid S2. The corresponding solenoids of tank B are designated S1b and S2b. Obviously, when both valves 46 and 48 of a tank are open, water will enter T-fitting 106 and inlet line 44 from both directions, whereas when main water valve 46 is closed, only a reduced flow can enter through the reduced pipes 96 and 104.

Figure 25 illustrates the detail construction of the major water valves 46 and the connection thereto of a solenoid S1. The view is typical of the construction of both major syrup valves 56, as well as the outlet valves 40.

It will be observed from Figure 25 that valve 46 includes a valve disk 107 urged to closed position by a coil spring 107′ and that the valve stem 107x extends to the exterior of the valve housing where its free end is pivotally connected intermediate the length of a lever 108. Lever 108 is pivoted at one end to a fitting secured to the valve housing and the opposite end of the lever is pivotally connected to a link 108′ carried by the armature of solenoid S1. Hence, when solenoid S1 is energized, lever 108 will be swung to open valve disk 107 against the action of spring 107′. When the solenoid is de-energized, spring 107′ will close valve disk 107 and return lever 108 to the position illustrated in Figure 25.

Still referring to Figure 25, a bar 108x is welded to the end of lever 108 adjacent the link 108′ so that the bar forms a continuation of the lever. Bar 108x has an aperture therethrough near its free end and a Bowden wire 109 movable in a cable casing 109x extends through the aperture in the bar. A stop collar 109′ is fixed to the end of the wire 109, the collar contacting with the bar 108x when pull is exerted on wire 109. The cable or casing 109x is suitably secured to various points of the machine and extends to the front wall 76 and through that wall. The end of wire 109 has a handle 46x secured thereto as shown in Figures 1 and 2. When handle 46x is pulled outwardly by an attendant, valve disk 107 will be opened and will remain open as long as the handle is held outwardly. If desired, provision may be made to hold the handle in outward position upon turning of the handle. When the handle is released, the action of coil spring 107′ in returning the valve disk 107 to closed position will also return the handle to inward position.

The major syrup valve 56 and the outlet valve 40 of each tank are of the same construction as is illustrated in Figure 25. The handles 56x and 40x for manual operation of those valves are illustrated in Figure 1. The outlet valve 40 preferably is of the same size as the major water valve 46, but the major syrup valve 56 is of somewhat smaller size.

The water and syrup inching valves 48 and 58 are also of the same construction as is illustrated in Figure 25 except that the inching valves do not have a bar 108x and operating wire 109 associated therewith. Hence, these valves are not operated in manual operation of the apparatus. The water inching valves are smaller than the major water valves and the syrup inching valves are smaller than the major syrup valves.

The syrup inlet piping is as follows: The common syrup supply line 34 is connected to two horizontal pipes 110 and 111 which extend in opposite directions across the rear of the apparatus. Pipe 110 leads to tank A, and pipe 111 leads to tank B. Also referring to Figure 5, at its outer end, pipe 110 is connected to a horizontal pipe 112 leading to the front of the apparatus and there connected to an upwardly extending pipe 114 which leads to a vertically arranged surge chamber 116. Below surge chamber 116 pipe 114 has an upper and rearwardly extending pipe 118 connected thereto which enters one arm of a T-fitting 120. The syrup inlet line 60 of tank A is connected to T-fitting 120. In addition, a small pipe 122 joins the T-fitting, pipe 122 being connected at its rearward end to a vertically extending reduced diameter pipe 124 which joins the rearward end of lower horizontal pipe 112. From the foregoing, it will be observed that syrup may flow to the T-fitting 120 and inlet pipe 60 either forwardly and thence rearwardly through the major pipes 112, 114 and 118, or upwardly and thence forwardly through the reduced diameter pipes 124 and 122. The major syrup flow valve 56 is positioned in the line 118 and, on tank A, is operated by a solenoid S3. The inching syrup flow valve 58 is connected in the pipe 122 and, on tank A, is operated by a solenoid S4. The corresponding solenoids of tank B are designated S3b and S4b.

Figure 9 shows the manner in which the water inlet pipe 44 is connected to the bottom wall 80 of each tank. The inner end of pipe 44 is connected to a T-fitting 126 which is closed at its lower end by a plug 128 and has a short fitting 130 connected to its upper end. Fitting 130 is secured by a collar 132 to a threaded sleeve 134 welded to the tank bottom wall 80. The fitting 130 includes interior radial vanes which, as best shown in Figure 11, form upper and lower spiders 136 and 138. A valve stem 140 is movable in a sleeve 142 extending downwardly from the lower spider 138. A collar 144 fitted in the upper spider 136 closely engages stem 140. At its upper end, stem 140 has a disc-type inlet valve 146 secured thereto. The lower surface of valve 146 is recessed to receive an annular seat 148 of suitable material adapted to seal against an upstanding outlet lip or seat 150 formed integrally with the fitting 130. Valve 146 is urged downwardly to seated position by a spring 152 which bears against a collar 154 threaded upon the lower and threaded end of stem 140, the upper end of the spring bearing against a collar 156 suitably fixed to the lower end of sleeve 142. Valve 146 is a check valve in that spring 152 exerts sufficient tension upon the stem 140 to move the valve 146 downwardly to closed position when no water is being forced into the inlet line 44 by the water pump. However, when the pump is operating and either water inlet valve is open, spring 152 will permit valve 146 to lift so that water may enter the tank past the valve.

It will be observed from Figures 7 and 9 that the disc valve 146 is of substantially greater diameter than the outlet lip 150 through which water moving through line 44 will enter the tank. By having valve 146 thus enlarged, water moving up through fitting 130 will be deflected radially beneath valve disk 146 and along the bottom wall 80 of the tank. As soon as the water level in the tank rises to the lower surface of the opened disk valve, all subsequently entering water will enter in a submerged stream, so that it cannot become aerated. Such aeration can occur when water jets upwardly in a body of air.

The plug 128 at the lower end of the T-fitting 126 may be provided with a drain cock 158.

As has been indicated above, syrup enters each tank through the inlet line 62 which curves upwardly and terminates in the lower portion of the upper cylinder 84. This results in syrup entering the tanks at a point very slightly below the level to which water rises in the tank.

The form of the syrup inlet valve 62x is shown in Figure 5a, from which it will be observed that it also is a spring-closed check valve of sufficient diameter to cause syrup to be fanned out radially, rather than spurted upwardly. Because the water level will be above the syrup inlet valves 62x when syrup is supplied to a tank, the syrup will not be flowed out into direct contact with air in the tank.

The syrup inlet line 62 may be braced within the tank by diagonal braces such as 158.

The manner in which the water probes are supported in the tanks is as follows: Referring to Figures 1, 5 and 14, which show the probes of tank A, it will be observed that each water probe comprises a metal rod or tube 160 which extends downwardly from a fitting 162 secured in the top wall 86 of the tank. The lower portion of the rods 160 are angled forwardly as indicated in Figure 5 and they are also angled laterally as indicated in Figure 1 so that the probes at the lower end of the tubes will be in axial alignment with the syrup probes 64 and 66. At its lower end, each rod 160 has a probe tip secured thereto. As is hereinafter explained, contact of liquid with the probe tip will cause a circuit to be formed and which circuit includes the probe and the liquid. Therefore, it will be understood that, within fitting 162, the rod 160 are suitably insulated from each other and from the tank top wall 86.

In order that the proportions of the two liquids being mixed may be varied, the upper and syrup probes 64 and 66 are vertically adjustable with respect to the lower and water probes 50 and 52. The structure whereby this adjustment is obtained is best indicated in Figures 5, 14 and 18. The rods 161 forming part of the syrup probes 64 and 66 extend downwardly into a tank from a fitting 166 fixed (Figure 1) on a horizontal bar 168 secured to the upper end of a tube 170. Tube 170 is vertically reciprocable in brackets 172 and 174 which, as best shown in Figure 18, extend outwardly from the tank wall. A sleeve 175 fixed to the brackets 172 and 174 encloses tube 170. At its lower end, the tube 170 has a collar 176 fixed thereto, and collar 176 is provided with a threaded bore adapted to be engaged by a screw shaft 178. Shaft 178 has an operating crank 180 fixed thereto below bracket 174 so that the shaft may be rotated relative to bracket 174. Suitable means is provided to hold shaft 178 against axial movement, while sleeve 170 is held against rotation by keyed relationship to bracket 172. Therefore, when shaft 178 is rotated, sleeve 170, bar 168 and fitting 166 will move vertically relative to the tank A. As best indicated in Figure 14, fitting 166 has a sleeve 182 depending therefrom and through an aperture 184 in the top wall 86 of the tank. A resilient annular gasket 186 may be secured to the tank top wall 86 surrounding aperture 184, the inner periphery of the gasket being adapted to contact with the outer surface of the depending tube 182 to maintain a seal against entry of foreign material into the tank.

It will be understood that the probes 64 and 66 are of the same construction as the water probes 50 and 52 and, within fitting 166, are suitably insulated from each other and from the tank. The probes of tank B are designated 50b, 52b, 64b, and 66b.

As illustrated in Figures 1 and 14, the upper cylinders of the tanks are cut out to receive sight glasses 188 and 190 through which the respective sets of probes will be visible. In order to render the probes more readily visible, a strip 192 of light refracting material illustrated in Figures 14 and 15 extends downwardly from the top wall of the tank. A casing 194 secured to the top wall of the tank contains an electric lamp so that light will be directed downwardly into strip 192. The surface of the strip 192 may be stippled opposite the two sets of probes as indicated at 196 in Figure 15. Hence, light will be refracted through the liquid and toward the probes so that the latter will be clearly visible against the bright background provided by the stippling.

The mixer 68 of each tank comprises an electric motor mounted upon a bracket 200 secured to the top wall 82 of the lower tank cylinder 78. The bracket 200 is of such design that it will support the motor with its shaft 202 at an inclination to the vertical. The motor shaft 202 projects through a sealed aperture 204 of the tank, and the impeller 206 is fixed to the shaft closely below wall 82. Rotation of impeller 206 will cause the body of liquid within the tank to be circulated so that a thorough mixing of the liquids is obtained. Such mixing is further assisted in the case of syrup and water because the more viscous and heavier syrup is flowed into the tank above the water. In other words, the heavier and more viscous syrup will tend to disperse downwardly through the water.

Because impeller 206 is positioned in the lower section 78, and the level of the liquid will be substantially above the impeller, operation of the impeller will not throw liquid upwardly to mingle with air.

The outlet arrangement of the tanks A and B is illustrated in Figures 1, 6, 7 and 19 to 21, all of these figures except Figure 1 being directed to the tank B structure.

Referring particularly to Figures 6, 7 and 19, it will be observed that the bottom wall 80 of each tank includes a well 210. The outer wall 212 of well 210 is formed by a downward extension of the side or peripheral wall of the tank. The end walls 214 of well 210 lie in planes parallel to a diameter of the tank, and the inner and bottom wall of the well is defined by a curved plate 216 as shown in Figure 6. The outer wall 212 of the well is provided with an aperture 218 to which the outlet line 38 is connected. Thus, liquid moving from a tank first passes down into well 210 and then moves from the well to the outlet line 38.

As is shown in Figure 1, the outlet lines 38 of the respective tanks join at a T-fitting 220 adjacent the front of the machine, the other outlet of the T-fitting being connected to the common outlet line 36. The respective outlet valves 40 are positioned in the lines 38 of the respective tanks. These valves are of the same general type as the water and syrup inlet valves. Valve 40 of tank A is operated by a solenoid S5 while outlet valve 40 of tank B is operated by a solenoid S5b.

An outlet probe 70 is provided adjacent the well 210 of tank A and a corresponding outlet probe 70b is similarly mounted in tank B. For example, as illustrated in Figures 6, 7 and 19, (which show tank B) outlet probe 70b includes a rod 222 which extends downwardly through the lower cylinder 78 of the tank, the rod being supported in a fitting 224 fixed to the top end of a tube 226 which extends upwardly from the annular top wall 82 of the tank lower cylinder 78. A collar 227 of insulating material may be secured to rod 222 within the lower portion of tube 226 so that vibration or swinging of the rod cannot bring it into contact with tube 226. The extreme lower end of the probe lies in a horizontal plane closely adjacent the bottom wall 80 of the tank. As is hereinafter described, an electric circuit including the probe and the body of liquid will be maintained so long as the level of the liquid is at a sufficient height that liquid will contact with the probe. It is desirable that this circuit be broken at the moment that the level of the liquid falls in well 210 to the bottom wall 80 of a tank. It is found that as the level of the liquid in the tank drops to a point slightly above the bottom wall of the tank, a vortex may normally develop at the outlet. If the vortex surrounds the outlet probe, the circuit through the probe and liquid may be broken before the level of the liquid has dropped to the desired point. In order to prevent such a vortex, the structure described immediately below is provided.

One factor in avoiding the formation of a vortex is the outline of well 210. That is, the downwardly and outwardly curving inner and bottom walls of the well minimize the formation of a vortex to some extent. However, in order to further avoid a vortex, the vertical plate assembly best illustrated in Figures 19 to 21 is also mounted in the well 210. The plate assembly includes a plurality of parallel plates 230 secured together by several transverse rods 232, the plates having substantially the same outline as the diametrical outline of the well 210.

However, the plates include ears 234 projecting from their lower and lateral edges so that a space will be provided between the edge of each plate and the adjacent surface of the well. A plate assembly may also include additional plates 236 having their outer edges 238 spaced from the adjacent outer wall 212 of the well by larger ears 241. The plates 236 are of less width than the plates 230 with the result that their inner edges 238 are spaced a substantial distance from the inner wall of the well. It will also be noted that the outer plates 230 are cut away at their lower inner edge as indicated at 240.

As shown in Figure 6, the plate assembly of Figures 20 and 21 will be so positioned with respect to the outlet aperture 218 that the central plate of the assembly will lie on the axis of the outlet aperture 218 and all of the other plates of the assembly will lie within the area of outlet opening 218 or closely adjacent that area.

The spacing of the plates with respect to each other is so arranged with respect to the diameter of the outlet aperture 218 that no vortex can extend from that outlet to a point adjacent the outlet probe.

As is shown with respect to outlet probe 70b in Figure 6, the outlet probes preferably lie closely adjacent one of the end plates 236 of the plate assembly.

A sight glass 246 may be mounted in an aperture 248 of each tank so that conditions in the bottom of the tank will be visible from the exterior. In more detail, during manual operation, sight glass 246 will enable the operator to ascertain when a discharging tank becomes emptied.

As has been indicated above, water initially entering a tank will be fanned out in a horizontal plane by the enlargement of the disk valve 146. In order to prevent this water from deflecting the probe 70, it is desirable to provide a vertical baffle plate 250 which extends upwardly from the bottom wall 80 of the tank adjacent the tip of the probes 70 and 70b and between the water valves and the probes. Baffle plate 250 may be arcuate in horizontal section and curved about a radius substantially concentric with the axis of the probe.

CIRCUITS OF APPARATUS

Introductory

The circuits hereinafter described will enable the apparatus to be operated according to any one of four different procedures; namely, "Continuous," "Test," "Final Run" and "Mixer Only." If one of the first three of these procedures is to be used, such procedure will be selected by manual operation of a rotary switch 250 shown in the lower left-hand corner of Figure 24. When switch 250 is operated to provide "Continuous" procedure or operation, the apparatus automatically and continuously will operate to fill one tank with the proper porportions of the liquids and then mix those liquids, all while the other tank is emptying. Then the filled tank will empty while the second tank fills. When switch 250 is set to "Test" position, one tank will fill completely with water and syrup but will not deliver its contents to the common outlet line 36. When switch 250 is set to "Final Run," a tank will fill and then empty to outlet line 36, but the other tank will remain empty. "Final Run" procedure ordinarily will be used at the end of a day's run, thereby enabling the plant to synchronize the termination of operation of the bottle washing apparatus of the plant with the apparatus of the present invention.

As has been stated above, the apparatus also can be manually operated. The fourth circuit procedure mentioned above, viz., "Mixer Only" will be used in conjunction with manual operation; that is, to operate mixer 68 or 68b when the major water and syrup valves and the outlet valves 40 are manually operated. "Mixer Only" procedure also will be used when only water is flowed into a tank under manual control, and the mixer of that tank is operated to agitate such water to thereby clear the tank of syrup traces. If the "Mixer Only" procedure is to be used, rotary switch 250 is operated to open position and the proper push button 250x or 250xb respectively shown in the upper portions of Figures 24 and 23 will be closed.

Each of the above procedures is separately described below under an appropriate heading.

Current is delivered to the apparatus from three main conductors 251, 252, and 253 fed through a main switch 254 shown at the lower right-hand corner of Figure 24. The conductors 251 and 253 connect to the primary of a transformer T, the secondary of the transformer being connected to conductors 255 and 256. The third main conductor 252 serves as a common line for various motors of the apparatus.

Secondary conductor 256 is connected by a lead 257 to each of three movable contacts 258, 259, and 260 of rotary switch 250, operation of switch 250 to its several positions causing the contacts 258, 259, and 260 to be variously brought into engagement with opposed fixed contacts 261, 262, and 263, respectively.

The other secondary conductor 255 is connected by a lead 265 to the wall of tank A so that liquid in that tank may serve as a conductor to thereby have a circuit relation with probes of tank A. Conductor 255 is also illustrated in Figure 23 as connected by leads 266 and 267 to the wall of tank B so that similar circuits can be established through the liquid and probes of that tank. During the cycle of operation of a tank, various indicating lights will be illuminated to give visual indication as to the stage of the cycle and the fact that the apparatus is operating properly. The circuits through these lights will be apparent from an inspection of Figures 23 and 24 and, therefore, in the following description the operation of the lights is omitted.

Figures 22, 23, and 24 show all relays in de-energized position. Switches 250 and 250x appear in off (open) position and switch 250xb appears in normal position, i. e., in such position that "Water Only" operation will not occur.

PROBE CONTROLLED DEVICES

As has been indicated in the above discussion of the apparatus, the sequence of operation during the filling cycle of tank A or tank B is primarily determined by the making or breaking of electrical circuits between the liquid in the tank and the probes 50, 50b, 52, 52b, 64, 64b, 66, 66b, 70, and 70b. Each probe forms a part of a probe controlled device diagrammatically illustrated in detail in Figure 22. In Figures 23 and 24, which show the wiring for the complete apparatus, the devices of Figure 22 are indicated by dot and dash line blocks each bearing an appropriate legend such as "Major Syrup Valve Probe Control." A relay in each device makes or breaks contacts to control other relays of the apparatus circuits. In Figure 22 this relay is designated PR. In Figures 23 and 24 the corresponding relays of tank A are designated PR1 to PR5, while those of tank B are designated PR1b to PR5b.

Each probe controlled device such as shown in Figure 22 comprises a transformer generally designated TT including a primary winding 270 which receives 115 volt 60 cycle current from conductors 255 and 256 by lines connected to binding posts 1 and 2 of the device. Transformer TT includes two secondary windings 271 and 272. One end of winding 271 is connected by a lead 273 to a binding post G connected to conductor 255 of the 115 volt line. The other end of winding 271 is connected by a lead 274 to a binding post P which, in turn, is connected to the probe of the device. The other secondary winding 272 has a rectifier 276 in circuit therewith so that this winding delivers direct current to relay PR by leads 277 and 278.

The device illustrated in Figure 22, and more particularly, its winding 271, is of such design that the strength of the field in the winding may be varied. For example, where water and syrup are being mixed, the probes which initially will be actuated by water alone or by a thorough mixture of water and syrup will set up a field which will extend the length of the winding, while the probes which are responsive to syrup alone will produce a field in only a portion of the winding. That is, because syrup is a better conductor than water, fewer coils are required in a winding to develop the required field strength in the winding.

The device of Figure 22 is also provided with three additional binding posts 3, 4 and 5. Binding post 4 has a lead 279 extending therefrom to a movable contact 4a which is controlled by the coil of the PR relays. The binding posts 3 and 5 have fixed contacts 3a and 5a respectively connected thereto by leads 280 and 281. As will become apparent from Figures 23 and 24, the binding posts 3, 4 and 5 are adapted to be connected to various elements of the circuit of the entire apparatus so as to control those circuit elements. Only the devices associated with the outlet probes include both fixed contacts 3a and 5a.

An additional fixed contact Pa is associated with the PR relays of each probe controlled device other than those associated with the outlet probes. Contact Pa is connected by a lead 282 to the lead 274 extending between secondary coil 271 and binding post P. A movable contact La is adapted to engage fixed contact Pa, contact La being connected by a lead 283 to a binding post L of the device. The purpose of the contacts La and Pa is to establish a holding circuit to maintain the coil of the PR relay energized independently of contact with the associated probe of liquid having the necessary operating conductivity.

The operation of each device illustrated in Figure 22 is as follows: So long as a 115 volt 60 cycle current is flowing to the binding posts 1 and 2 from conductors 255 and 256, a flux will be set up in the primary winding 270. However, unless a closed path exists through secondary coil 271, no flux will be available in the other secondary winding 272 to generate current in the relay PR. On the other hand, as soon as a closed path exits through the secondary winding 271, as will occur when liquid of the proper conductivity contacts with the probe of that winding, flux will be available to link the winding 272 with the coil of the PR relay. With relay PR thus energized, its movable contact 4a will be actuated accordingly. If the device also includes the second movable contact La, that contact will also be operated to make a holding circuit through the coil of the PR relay.

In Figures 23 and 24, the dash line blocks representing probe controlled devices such as shown in Figure 22 omit the transformer TT and the connections of that transformer to the binding posts 1, 2, and G, as well as the connections between the transformer TT and the PR relay. However, the dash line blocks of Figures 23 and 24 do include the binding posts 1 to 5, P, L, and G and show the exterior circuits connected to those binding posts as well as the interior circuits extending between the PR relay contacts and the binding posts 3, 4, 5, P, and L.

CONTINUOUS PROCEDURE

When the apparatus is to be operated continuously, the rotary switch 250 will be turned to such position that a rise 285 on each of three co-axial disks 286 fixed to the switch shaft will be brought against the movable contacts 258, 259 and 260, thereby pressing the movable contacts against the fixed contacts 261, 262, and 263.

The engagement of the contacts 260 and 263 will close the following circuit: From conductor 256, by lead 257, across contacts 260 and 263, by lead 287 to the coil of relay R4, and then by leads 288 and 289 to conductor 255. Energization of R4 closes its contacts and enables the outlet valve probe control of one tank to operate to stop mixing in the other tank and cause the latter to empty.

Assuming that, at this moment, tank A is emptying, the armature of a transfer relay R1 will be latched in upward position so that all of its movable contacts c11, c12, c13, and c14 will be lifted into engagement with fixed contacts connected to leads 292, 293, 294, and 295. Relay R1 is termed a transfer relay or switching means because it largely effects transfer of operation from one tank to the other, viz., causes the outlet valve of one to be held open while the filling, or proportioning and mixing, cycle is conducted in the other tank. However, operation of relay R1 from one position to the other is controlled by the outlet probes PR5 and PR5b and, therefore, these probes may be regarded as means actually to control transfer of operation from one tank to the other.

The armature of relay R1 will be held in the upward position described above by means of a latch 296 controlled by a relay R2. As a result, the outlet valve 40 of tank A will be held open due to energization of its solenoid S5 by the following circuit: From conductor 256, by contact 261 of rotary switch 250, lead 297, contact c11 of relay R1, leads 292 and 298 through solenoid S5, by leads 299 and 300 to conductor 255. Hence, tank A will be emptying through its open outlet valve 40.

At this time, the primary coil 270 of each probe control of tank A, viz., the probe controlled devices shown in dot and dash line blocks in Figure 24, will be receiving current from the conductors 255 and 256 associated with main transformer T of Figure 24. For example, considering together the entire circuit of tank A shown in Figure 24 and the typical probe controlled device circuit of Figure 22, the "Outlet Valve Probe Control" shown in the lower right-hand portion of Figure 24 will have current flowing through its primary coil 270 shown in Figure 22 through the following path: From conductor 255 of Figure 24 by lead 301 to binding post 1 of the Figure 22 device, thence through the primary coil 270 of transformer TT to binding post 2 and thence (Figure 24) by leads 302 and 303, contacts 262 and 259 of switch 250 to conductor 256. The fact that the mixed liquid in the tank is in contact with outlet probe 70 will cause a path to be closed through the secondary winding 271 of transformer TT of the Outlet Valve Probe Control of Figure 22 as follows: From Figure 24 conductor 255 by lead 265 to the wall of tank A, thence through the liquid to probe 70 and binding post P. Referring to Figure 22, from binding post P the path will be by lead 274, winding 271, lead 273 to binding post G and then (Figure 24) by leads 304 and 301 back to conductor 255. A flux will thereby be created in the secondary winding 272 of transformer TT to act through the leads 277 and 278 to energize the coil of the corresponding probe control relay designated PR5 in Figure 24. The energization of relay PR5 will hold its movable contact 4a upward in engagement with the fixed contact 5a of that relay. As a result, the following circuit will be closed through the contacts of probe controlled relay PR5 and the coil of a relay R3: From conductor 256 and engaged contacts 259 and 262 of rotary switch 250 by leads 303, 302, and 308 to binding post 4, across the contacts 4a and 5a, binding post 5, and by leads 309 and 310 to the coil of relay R3, thence by leads 311 and 265 to conductor 255.

As is hereinafter explained, during the latter portion of the emptying of tank A, the mixer 68 of tank B will be in operation and the outlet valve 40 of tank B will be closed.

*Continuous procedure—tank A empty*

When the level of the liquid in the emptying tank A drops away from the outlet probe 70, the relay PR5 of the associated Outlet Valve Probe will de-energize. That is, referring to Figure 22, the electrical path from the wall of tank A, through the liquid to the probe 70 and thence through secondary winding 271 will be broken so that no flux will be available to generate a current in the coil of relay PR5. Therefore, the movable contact 4a of that relay will drop against its lower contact 3a to establish the following circuit: From conductor 256, engaged contacts 259 and 262 of switch 250 by leads 303, 302 and 308, contacts 4a and 3a of the tank A Outlet Valve Probe Control, by lead 315 to contact c42 of energized relay R4 and thence by lead 316 (continued on Figure 23), across the then closed contact c57b of a relay R5b associated with tank B, thence by a lead 317 (continued on Figure 24) through the coil of latching relay R2 and thence by a lead 289 to conductor 255. Th energization of the latching relay R2 will move its armature to the right as viewed in Figure 24 so that its latch 296 will move out of engagement with the head 319 of the armature of transfer relay R1. Therefore, the four contacts of the relay R1 will drop.

The dropping of the four contacts of relay R1 will set up the circuits respectively described in the next five paragraphs.

Dropping of contact c11 will cause outlet valve 40 of tank B to open because of the following circuit: From conductor 256, by engaged contacts 258 and 261 of rotary switch 250, lead 297, contact c11, lead 320 (continued on Figure 23) to the coil of tank B outlet valve solenoid S5b and thence by lead 321 to conductor 255. Therefore, tank B will now begin to empty. Contact c11 may be termed the outlet valve controlling contact of transfer relay R1.

*Continuous procedure—water in-flow*

The dropping of relay R1 contact c12 from its uppermost fixed contact will cause the mixer 68 of tank B to stop operation as hereinafter described. In addition, engagement of c12 with its lower fixed contact will cause the main or major water valve 46 of tank A to open by the action of the following circuit: From conductor 256 by engaged contacts 259 and 262 of rotary switch 250, by leads 303, 322, and 323 across dropped contact c12, by lead 324 to the lowered movable contact 4a to fixed contact 3a of probe relay PR1 included in the Major Water Valve Probe Control associated with the main water probe 50, by lead 325 to the coil of relay R6, and thence by lead 300 to conductor 255. Relay R6 will thereby be energized to lift its movable contact c61 into engagement with its fixed contact c62, closing the following circuit to open the main or major water inlet valve 46 of tank A: From contact c12 of relay R1, by leads 324, 326, and 327 to the lowered and closed contact c71 of de-energized water flow controlling relay R7, by lead 328 to the contact c61 of relay R6, by lead 329 through the coil of major water valve operating solenoid S1 and by leads 330 and 300 to conductor 255. Contact c12 may be termed the liquid valve controlling contact of transfer relay R1.

The dropping of relay R1 contact c13 will cause the water pump 42 to be operated by the following circuit: From conductor 256 through engaged contacts 259 and 262 of rotary switch 250, leads 303, 322 and 323, contact c13, lead 340, contact c74 of de-energized water flow controlling relay R7, lead 341 (continued on Figure 23), through the water pump 42, and by lead 342 to conductor 255. Contact c13 may be termed the pump controlling contact of transfer relay R1.

The dropping of contact c14 of relay R1 will close a partial path by means of which holding circuits later may be set up through the relay coils of the probe controlled devices. For the present, it will be observed that when contact c14 drops, a partial circuit is set up from conductor 255 by lead 289, across c14 and to a lead 344 which joins the binding post L of each probe controlled device of tank A except that of the Outlet Valve Probe Control. Contact c14 may be termed the probe control holding contact of transfer relay R1.

With water pump 42 operating, water will flow through common water inlet line 32 and then by the pipes 92, 94 and 102 past major water inlet valve 46 to tank A. A very slight rise in the tank A water level will cause a circuit to be closed between the water and the outlet probe 70. Hence, the same circuit will be closed through relay PR5 contacts 4a and 3a as has been described above in the fourth paragraph following the heading "Continuous procedure." This circuit will energize relay R3 to lift its contacts so that the water inching valve solenoid S2 will be energized by the following circuit: From conductor 255, by leads 300, 345, solenoid S2, lead 346, lowered movable contact c72 of de-energized relay R7, leads 347 and 348, raised contact c31 of relay R3, leads 327, 326 and 324, contact c12 of relay R1 and leads 323, 322 and 303 through closed contacts 262 and 259 of switch 250 to conductor 256.

The water inching valve 48 of tank A now being open, water will also flow into the tank A through the relatively small pipes 96 and 104.

The closing of the circuit through contacts 4a and 5a of relay PR5 mentioned two paragraphs above will also break the circuit through the coil of latching relay R2 mentioned above in the first paragraph following the heading "Continuous procedure—tank A empty." However, the head 319 of the R1 armature is now free of latch 296.

*Continuous procedure—water shut-off*

When the water level in tank A reaches the main or major water probe 50, the relay PR1 of the major water valve probe control will be energized in the manner described above under the heading "Probe Controlled Devices." The energization of PR1 will open the circuit through the coil of relay R6 with the result that solenoid S1 will de-energize to permit tank A major water valve 46 to close. This circuit has been described above in the first paragraph after the heading "Continuous Procedure—Water In-Flow." When relay PR1 is energized, it will lift the movable contact La of relay PR1 into engagement with contact Pa. This will close a holding circuit through the coil of relay PR1 as has been described above under the heading "Probe Controlled Devices." As has been mentioned above, this circuit will be held so long as the movable contact c14 of relay R1 is dropped.

Water will now enter the tank A only through inching valve 48. Because this flow is relatively slight, there will be no possibility of an oversupply of water beyond that required to operate the water inching probe 52 as described in the immediately succeeding paragraph.

When the water level reaches the probe 52 of the water inching valve probe control, relay PR2 will be energized so that its contacts 4a and La will lift. The lifting of contact La will close a holding circuit through PR2 as described above under the heading "Probe Controlled Devices." The lifting of PR2 contact 4a will close the following circuit to energize relay R7: From conductor 256, through the engaged contacts 259 and 262 of rotary switch 250 by leads 322, 323 to contact c12 of relay R1, leads 324, 326 and 327, across closed contact c31 of relay R3, lead 348 to contacts 4a and 5a of the water inching valve relay PR2, lead 353, coil of relay R7 and lead 265 to conductor 255. A holding circuit will be closed through the coil of relay R7 by the lifting of its upper contact c76, this circuit extending from lead 353 across contact c76 and thence by leads 347 and 348 through the closed contact c31 of relay R3, leads 327, 326, and 324 to the contact c12 of relay R1, connected to conductor 256.

The energization of relay R7 has the results described in the four succeeding paragraphs.

Lifting of the contact c74 breaks the circuit to the water pump 42 described above in the second paragraph following the heading "Continuous Procedure—Water In-flow." Hence, delivery of water to tank A from common water inlet line 32 will stop.

Continuous procedure—syrup flow

Lifting of R7 contact $c75$ closes the following circuit through the syrup pump 54: From lead 340 (connected through relay R1 contact $c13$ to conductor 256) across contact $c75$, by lead 357 to the lowered contact $c55$ of de-energized relay R5, by lead 358 (continued on Figure 23), to the syrup pump 54, and thence by lead 359 to conductor 255.

Lifting of R7 contact $c73$ closes the following circuit to energize solenoid S4 to thereby open the tank A syrup inching valve 58: From lead 326 (connected to conductor 256 through R1, $c12$) across contact $c73$, by lead 360 to lowered contact $c56$ of relay R5, lead 361, through the solenoid S4, and by leads 362, 363, and 265 to conductor 255.

The major syrup valve 56 of tank A will simultaneously be opened by the following circuit through its solenoid S3 and which circuit is in parallel with the just-described circuit through solenoid S4; from solenoid S4 by leads 362, 363, and 365 through S3, lead 366, contact $c58$ of R5, lead 367 to contact $3a$ and lowered contact $4a$ of the Major Syrup Valve Probe Control, and then by leads 368 and 369 to lead 360, connected to contact $c73$ of R7.

Hence, syrup will flow from syrup pump 54 to common syrup inlet line 34 shown in Figure 2, and by lines 110 and 112 to the pipes 112 and 118 (Figure 5) from which it will pass through syrup inlet valves 56 and 58 to tank A. As appears in Figure 1, the syrup inlet pipe 62 opens immediately below the level to which water rises into the tank. Therefore, the syrup is flowed into the extreme upper portion of the water.

Because energization of relay R7 stops the water pump 42 and starts the syrup pump 54, it might be termed a pump switching relay. Its energization also further interrupts the already open circuits to the water inlet valves.

Continuous procedure—syrup shut-off

When the level of the mixture reaches the lower and major syrup probe 64, relay PR3 of the Major Syrup Valve Probe Control will be energized to lift its contact $4a$, thereby breaking the circuit through solenoid S3 described three paragraphs above. Hence, syrup will continue to flow in small volume and through syrup inching valve 58. The contact $La$ of relay PR3 will also engage contact $Pa$ to close a holding circuit through PR3 as has been described above under the heading "Probe Controlled Devices."

When the rise of liquid causes a circuit to be closed through the syrup inching probe 66 as described above under the heading "Probe Controlled Devices," relay PR4 of the syrup inching valve probe control will be energized to lift its contact $4a$ as well as its contact $La$. The lifting of $La$ will close a holding circuit through PR4 in the same manner mentioned in connection with other PR relays. The lifting of contact $4a$ will result in the energization of the coil of relay R5 by the following circuit: From conductor 255, by lead 265 through the coil of relay R5, by leads 373 and 374 through contacts $5a$ and $4a$ of relay PR4 of the Syrup Inching Valve Probe Control and by leads 375, 369, and 360 to the closed contact $c73$ of relay R7, then by leads 327, 326 and 324 to contact $c12$ of relay R1 and then by leads 323, 322 and 303 to engaged contacts 259 and 262 to conductor 256.

The energization of coil R5 causes a holding circuit to be closed from lead 373, through its contact $c51$, lead 376 and closed contact $c32$ of relay R3, lead 377, closed contacts $c21$ and $c22$ of latching relay R2, leads 378, 323, 322, and 303 by contacts 262 and 259 to conductor 256.

The energization of relay R5 described in the preceding paragraph and the resultant lifting of its contacts will have the effects described in the five succeeding paragraphs.

The lifting of contact $c55$ will break the circuit to syrup pump 54.

The lifting of $c58$ will discontinue the circuit through the main syrup valve solenoid S3. However, this circuit already has been broken by the energization of PR3 described above as occurring when the liquid level contacted with main syrup probe 64.

The lifting of contact $c56$ will open the circuit through the solenoid S4 thereby permitting the syrup inching valve to close so that no further syrup will enter tank A.

Continuous procedure—mixing

The lifting of the contacts $c52$, $c53$, and $c54$ of relay R5 will cause the mixer 68 of tank A to operate. The power for operating the mixer motor is obtained through leads 380, 381 and 383 which extend in parallel from the main conductors 351, 352 and 353 and through the above-mentioned contacts.

The lifting of the contact $c57$ sets up a potential circuit through the coil of transfer relay R1. This circuit will be completed when tank B empties and is hereinafter described.

In view of the above, filling of tank A will stop and its contents will now be stirred by impeller 68 to produce a thorough intermixing of the syrup and water.

The fact that the final flow of both water and syrup is reduced by the inching valves insures that the final rise of liquids will be slow and will not override the probes 52 and 66. Hence, an accurate mixture will result.

Because energization of relay R5 finally stops syrup flow, it might be regarded as a syrup cut-off relay.

Continuous procedure—mixture discharges

Mixing of the liquid in tank A will continue until tank B empties, i. e., the level of the mixture therein falls out of contact with tank B outlet probe $70b$. Until this moment a path has been maintained from the tank wall of B, through the liquid to probe $70b$ then through the secondary winding 271 (Figure 22) of transformer TT to maintain relay $PR5b$ energized as described above under the heading "Probe Controlled Devices."

Energization of $PR5b$ has held its movable contact $4a$ up against contact $5a$ to energize relay $R3b$ as follows: From engaged contacts 259 and 262 of rotary switch 250, by leads 303 and 322 (continued on Figure 23) contacts $4a$ and $5a$ of tank B Outlet Valve Probe Control, lead 380, through coil of $R3b$ to conductor 255. Although the contact $c31b$ of $R3b$ thus has been lifted, no circuit has been closed therethrough because contact $c12$ of transfer relay R1 has been out of engagement with its upper fixed contact 293.

When tank B empties and its relay $PR5b$ de-energizes, its contact $4a$ will drop to complete the following circuit: From conductor 256 by engaged contacts 259 and 262 of rotary switch 250, by leads 303, 322 (continued on Figure 23) to contacts $4a$ and $3a$ of $PR5b$, by lead 390 (continued on Figure 24), contact $c41$ of energized relay R4, lead 391 to closed contact $c57$ of tank A relay R5, lead 392, coil of transfer relay R1, and leads 393 and 289 to conductor 255.

The energization of transfer relay R1 will cause its armature head 319 to move to the dotted line position of Figure 24, so that latch 296 of latching relay R2 can swing outwardly or to the left in Figure 24 and hold the R1 armature latched up. This movement of latch 296 will cause its contact $c22$ to disengage contact $c21$, to break the holding circuit through the coil of relay R5 and its contact $c51$ described above in the third paragraph following the heading "Continuous Procedure—Syrup Shut-Off." Hence, the circuit to impeller 68 of tank A will open, so that mixing of the tank A mixture will cease. The only other immediate effect of the dropping of the R5 contacts will be to open the circuit through the coil of transfer relay R1 described in the opening portion of the present paragraph. However, the armature of R1 has, of course been latched up.

The lifting of the four R1 contacts will have the results described in the four succeeding paragraphs.

Lifting of R1 contact $c11$ will close the following circuit to open outlet valve 40 of tank A: From switch 250, contacts 258 and 261, lead 297, contact c11, leads 292 and 298, solenoid S5, leads 299 and 300 to conductor 255. Hence, tank A will begin discharge by line 38 to common outlet line 36 leading to a carbonator. The lifting of c11 from lead or contact 320 will open the circuit which has been holding outlet valve 40 of tank B open. This circuit has been described above in the paragraph immediately preceding the heading "Continuous Procedure—Water In-flow." Hence, tank B will stop discharge.

The lifting of R1 contact c12 from lower fixed contact or lead 324 will result in de-energization of relay R7 by breaking the holding circuit through its coil and contact c76 which was closed when the water level rose to water inching probe 52. This circuit has been described above in the third paragraph succeeding the heading "Continuous Procedure—Water Shut-off." Such circuits as were set up through the contacts c71 to c75 of relay R7 have already been broken at other points therein. The movement of R1 contact c12 into engagement with upper fixed contact or lead 293 will cause tank B circuits to be closed corresponding to the tank A circuit described above as closed under the heading "Continuous Procedure—Water In-flow." Therefore, major water valve 46 of tank B will open and, after water pump 42 starts operation, inching water valve 48 will open.

The lifting of R1 contact c13 into engagement with upper lead or contact 294 will close tank B circuits corresponding to the tank A circuit described above under the heading "Continuous Procedure—Water In-flow." As the result, water pump 42 will operate. Movement of c13 from lower contact or lead 340 will have no effect upon tank A circuits because the pump circuits which were connected to 340 through tank A controls already have been opened by the energization of relay R5 described in the fourth paragraph following the heading "Continuous Procedure—Syrup Shut-off."

The lifting of R1 contact c14 from lower lead or contact 344 will break the holding circuits through the tank A probe relays PR1 to PR4. Engagement with upper lead or contact 295 will set up paths for corresponding holding circuits through the coils of tank B probe relays PR1b to PR4b.

In short, the lifting of the transfer relay R1 contacts has transferred power to tank B circuits, the only tank A circuit through R1 which is now closed being that through c11 to hold the tank A outlet valve 40 open. Hence, tank A will empty and tank B will now operate through the same cycle as has been set forth above for tank A with regard to water flow and shut-off, syrup flow and shut-off and mixing.

The tank B relays, contacts, solenoids, and probes of Figure 23 bear the same reference characters as the corresponding elements of tank A and Figure 24, plus the final letter "b." In view of this, the tank B circuits readily can be understood in the light of the description of the tank A circuit operation.

When tank A empties, relay R2 will be energized to permit the R1 contacts to drop, just as described in the opening portion of this description under the heading "Continuous Procedure—Tank A Empty."

It will be observed that when tank A is empty the circuit closed by de-energization of its outlet probe relay PR5 energizes latching relay R2 to unlatch R1 so that the latter will drop and thereby shift the filling controls to fill tank A. On the other hand, when tank B is empty, de-energization of its outlet probe relay PR5b causes R1 to be energized to lift and thereby shift the controls to fill tank B. The slight difference between the circuits of the two tanks accommodates this difference in operation.

TEST PROCEDURE

As has been stated above, when it is desired to test the apparatus, a tank may be filled with water and syrup, but that tank will then remain filled, without discharging to the outlet line. To operate by test procedure, the switch 250 will be rotated to bring a rise 400 on its center cam disk 286 against the movable contact 259, pressing the latter against fixed contact 262. The other two movable contacts 258 and 260 of switch 250 will remain in lowered position so as not to engage their opposed fixed contacts 261 and 263, respectively. With contact 261 unconnected to conductor 256, relay R1 contact c11 and the outlet valve solenoids S5 and S5b will receive no current, so the outlet valves 40 of the respective tanks will be closed. With contact 263 of switch 250 not connected to conductor 256, relay R4 will be de-energized and its contacts open. Hence, the outlet probe (PR5 or PR5b) of one tank cannot be connected, through energization of relays R5b or R5, to the coil of transfer relay R1 or its latching relay R2.

With relay R1 de-energized, tank A will fill with the same sequence and circuit operation described in the portion of the above specification beginning with the heading "Continuous Procedure—Water In-Flow" and extending through the section entitled "Continuous Procedure—Mixing." In other words, the two liquids will flow into the tank in the proper proportions and the tank A impeller 68 will then operate. Operation of the impeller will continue until switch 250 is moved to open position or to "Continuous Procedure" position. Usually, when a tank has been filled by "Test" procedure, the attendant will then rotate switch 250 to "Continuous Procedure" position. In such case, the "Continuous Procedure" circuits then will be effective to empty the filled tank and fill the other tank and continue their alternate operation as long as desired.

FINAL RUN PROCEDURE

For final run procedure, switch 250 will be rotated to bring a rise 401 on its left-hand (Figure 24) disk 286 into engagement with movable contact 258 to force the latter against fixed contact 261. This will be done after one tank has emptied and, therefore, the other tank is filled and mixed. For example, suppose tank A has just emptied and tank B is full, so that the contacts of relay R1 are in the dropped position of Figure 24. If switch 250 is now operated to final run position, the only circuit through that switch will be from conductor 256, by contacts 258 and 261, by lead 297, contact c11 of R1 to lower contact or lead 320 (continued on Figure 23) to solenoid S5b, and by lead 321 to conductor 255. Energization of S5b will hold the tank B outlet valve 40 open so that tank B will empty, but the apparatus will then perform no other operation. When tank B is completely empty, switch 250 can be operated to open position to break the single circuit used in final run procedure.

If tank B has just emptied and tank A is full, so that the contacts of R1 are raised, operation of switch 250 to final run position will energize tank A solenoid S5 as follows: From conductor 256, contacts 258 and 261 of switch 250, lead 297, R1 contact c11, leads 292 and 298, S5 and leads 299 and 300 to conductor 255.

As has been stated above, final run procedure is ordinarily used at the end of a day's run and provides a full tank, viz., a batch of a known quantity of mixture, for the final output of the day. Hence, the bottle washing machine of the plant can be stopped when it has produced enough cleaned bottles for that batch.

MIXER ONLY PROCEDURE

This procedure is used only when the valves of the apparatus are being controlled by hand. Hand or manual operation ordinarily only will be used if some control or other automatic element becomes inoperative, or upon occasions when it is desired to flush the tanks. Operation for each such purpose is described below.

Complete manual operation

When the apparatus is to be operated entirely by hand to perform its normal proportioning and mixing, the operator will move the rotary switch 250 to "off" position so that no current will flow through any of the contacts of that switch. Hence, all of the solenoid operated valves of the apparatus will be closed by the action of the springs 107' associated therewith and indicated in Figure 25. Assuming that the tank A is first to be filled, the operator will pull the handle 46x at the right-hand side of the front wall 76 illustrated in Figure 1. The lever 108 (indicated in Figure 25) of major water valve 46 of tank A will thereby be lifted by pull exerted upon the wire 109 so that the valve disk 107 will be raised against the pressure of spring 107'. Water will thus flow into tank A through this major water valve. The operator will permit the water flow to continue until he observes through the tank A sight glass 190 that the level of the water has risen to the upper and major water probe 52. When the water level reaches this point, the operator will release handle 46x and then pull handle 56x. The major water valve 46 will thus close and the major syrup valve 56 will open. Handle 56x will be held outwardly until the syrup level reaches the upper and major syrup probe 66. When the syrup reaches this point, the operator will release handle 56x.

In order to mix the syrup and water in tank A, the operator will now close the push button switch 250x shown at the upper right of Figure 24. Closing switch 250x will complete a circuit independent of the rotary switch 250 and which circuit will energize relay R5 through the following path: From conductor 255 by lead 265, coil of R5, and by leads 373 and 411 to conductor 256. The contacts of R5 will thereby lift so that a circuit to tank A mixer 68 will be closed through the R5 contacts c52, c53, and c54 to the leads 380, 381 and 382. With switch 254 closed, the tank A mixer 68 will operate to mix the liquids in the tank. It will be noted that the lifting of the other R5 contacts will not close any circuits because switch 250 is open. Even the holding circuit through the contact c51 will not be closed because that circuit is dependent upon the energization of relay R3. Hence, switch 250x must be held closed to keep mixer 68 functioning.

When operation of mixer 68 has continued for a sufficient time to thoroughly mix the syrup and water, the operator will open switch 250x so that relay R5 will de-energize and the mixer will stop. Then the operator may pull the handle 40x of tank A to open the tank A outlet valve 40 so that the mixture will flow to the carbonator by outlet pipe 36.

Assuming the tank B is now to be filled, the operator will perform the same operations as described above with the tank B manual controls, including closing the switch 250xb to operate tank B mixer 68. The circuit closed by switch 250xb through the coil of relay R5b is as follows: From conductor 255 (Figure 23) by leads 413, 414, 415, 416, and 417, through the coil of relay R5b, by lead 418 through switch 250xb and then to conductor 256.

The operator may maintain 250xb closed until he observes through the tank A outlet sight glass 246 that tank A has emptied. Then the operator will open the outlet valve 40 of tank B and close the outlet valve 40 of tank A so that the latter tank can be filled.

Flushing

When it is desired to flush the apparatus, rotary switch 250 will be opened so that all controls will be de-energized and the valves closed. Then, to flush tank A, the operator will pull handle 46x of that tank so that water may flow into tank A past major water valve 46. This flow will be permitted to continue until the water level rises some distance above the upper syrup probe 66. Hence, if the operator now closes switch 250x the entire inner surface of tank A will be thoroughly flushed of syrup traces by the agitation of the water. Obviously, operation of handle 40x will remove the water from tank A and the same operation then can be performed with respect to tank B.

CONCLUSION

The general operation of the apparatus has been set forth above immediately following the description of the figures of the drawings. The detailed operation of the apparatus and circuits will be clear from the portion of the specification following the heading "Circuits of Apparatus."

It will be observed that the invention comprises an apparatus which can be used to exactly proportion liquids and, if desired, agitate the liquids for thorough mixing.

The terminology used in the specification is for the purpose of description and not of limitation, the scope of the invention being defined in the claims.

We claim:

1. In a liquid proportioning apparatus, a first tank, a second tank, a mixer in each of said tanks, an inlet in each tank, first and second liquid pumps, supply lines respectively extending between the outlet of each pump and the inlet of each tank, a major inlet valve and a minor inlet valve in each of said liquid supply lines, an outlet valve in each tank, transfer means to control alternate operation of said outlet valves to open position, a lower liquid level operated means in each of said tanks to actuate said transfer means, said lower liquid level operated means of said first tank being operatively connected to said transfer means to actuate the latter to close the outlet valve of said first tank and open the outlet valve of said other tank, means operated by said transfer means to actuate said first liquid pump and open said first liquid major and minor inlet valves of said first tank, a second liquid level operated means effective upon rise of liquid in said first tank to operate said first liquid major inlet valve to closed position, means including a third liquid level operated means effective upon further rise of liquid in said first tank to stop operation of said first liquid pump, close said first liquid minor inlet valve, operate said second liquid pump and open both the second liquid major and minor inlet valves to said first tank, shut-off means including a fourth liquid level operated means effective upon still further rise of liquid in said first tank to close said last-opened inlet valves to said first tank, stop said second liquid pump and operate said mixer of said first tank, the lower liquid level operated means in said second tank, said transfer means and said shut-off means being operatively connected so that a drop of liquid level in said second tank will operate said transfer means to reverse the position of the outlet valves of said tanks, and stop operation of the mixer of said first tank.

2. A liquid proportioning apparatus of the character described in claim 1 wherein said transfer means and said means including liquid level operated means include electrical relays.

3. A liquid proportioning apparatus of the character described in claim 1 wherein said transfer means and said means including liquid level operated means include electrical relays, the relay included in the transfer means controlling a holding circuit through the coil of the relay included in said shutoff means to that operation of the transfer means relay effected by the lower liquid level operated means of said second tank will break said holding circuit.

4. In a liquid proportioning apparatus, a tank structure, a pair of inlet valves, an outlet valve, a mixer within said tank structure, liquid level responsive means to open and close said inlet valves in sequence and thereafter operate said mixer and then open said outlet valve, and means to operate said valves and mixer independently of said liquid level responsive means.

5. In a liquid proportioning apparatus, a tank structure, a pair of inlet valves, a mixer within said tank structure, means to open one of said inlet valves, a first means responsive to rise of liquid in said tank structure to close said opened inlet valve and open said other inlet valve, and a second liquid level actuated means responsive to a further rise of liquid in said tank structure to close said last-opened inlet valve and operate said mixer.

6. A liquid proportioning apparatus of the character described in claim 5 including means to operate said mixer independently of said liquid responsive means.

7. A liquid proportioning apparatus of the character described in claim 5 including means to operate said valves independently of said liquid responsive means.

8. In a liquid proportioning apparatus, a tank structure, a pair of inlet valves, an outlet valve, means to open one of said inlet valves, means responsive to rise of liquid in said tank structure to close said opened inlet valve and open said other inlet valve, a second liquid level responsive means to close said last-mentioned inlet valve and open said outlet valve, and a mixer device within said tank structure rendered operable for mixing liquids by said second liquid level responsive means upon closing of said last-mentioned inlet valve.

9. In a liquid proportioning apparatus, a tank structure, a pair of inlet valves, an outlet valve, means to open one of said inlet valves, means responsive to rise of liquid in said tank structure to close said opened inlet valve and open said other inlet valve, a second liquid level responsive means to close said last-mentioned inlet valve and open said outlet valve, a mixer device within said tank structure rendered operable for mixing liquids by said second liquid level responsive means upon closing of said last-mentioned inlet valve, and means to render said mixer inoperable.

References Cited in the file of this patent
UNITED STATES PATENTS

| Number | Name | Date |
|---|---|---|
| 820,429 | May | May 15, 1906 |
| 1,227,287 | Mansfield | May 22, 1917 |
| 1,404,745 | Donauer | Jan. 31, 1922 |
| 1,541,987 | Mascall | June 16, 1925 |
| 1,552,629 | Mason et al. | Sept. 8, 1925 |
| 1,604,763 | Snyder | Oct. 26, 1926 |
| 1,737,609 | Nielson | Dec. 3, 1929 |
| 1,890,634 | Wenzel | Dec. 13, 1932 |
| 1,897,398 | Raymond | Feb. 14, 1933 |
| 1,907,001 | Peter | May 2, 1933 |
| 1,909,150 | Bell-Irving et al. | May 16, 1933 |
| 1,916,555 | Brown | July 4, 1933 |
| 1,991,021 | Leisten et al. | Feb. 12, 1935 |
| 2,036,217 | Jordan | Apr. 7, 1936 |
| 2,044,017 | Robb | June 16, 1936 |
| 2,045,389 | Helmore et al. | June 23, 1936 |
| 2,094,778 | Alexander | Oct. 5, 1937 |
| 2,123,809 | Seitz | July 12, 1938 |
| 2,167,497 | Bracke | July 25, 1939 |
| 2,179,246 | Applebaum | Nov. 7, 1939 |
| 2,184,085 | Ruetz | Dec. 19, 1939 |
| 2,214,658 | Browning | Sept. 10, 1940 |
| 2,230,137 | Ewertz | Jan. 28, 1941 |
| 2,249,794 | Sutton | July 22, 1941 |
| 2,376,694 | Hewlett | May 22, 1945 |
| 2,391,003 | Bowman | Dec. 18, 1945 |
| 2,396,527 | Osborne | Mar. 12, 1946 |
| 2,406,203 | Cruzan et al. | Aug. 20, 1946 |
| 2,457,155 | Jackson | Dec. 28, 1948 |
| 2,488,817 | Kaminky | Nov. 22, 1949 |
| 2,505,905 | McAfee | May 2, 1950 |
| 2,527,005 | Glover | Oct. 24, 1950 |
| 2,600,521 | Swisher | June 17, 1952 |
| 2,644,333 | Duus | July 7, 1953 |